United States Patent
Hayes et al.

(10) Patent No.: US 11,946,235 B2
(45) Date of Patent: Apr. 2, 2024

(54) FAUCET HANDLE ASSEMBLY

(71) Applicant: Delta Faucet Company, Indianapolis, IN (US)

(72) Inventors: Gerald Robert Hayes, Lebanon, IN (US); Brian Wayne Johnson, Muncie, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 17/498,850

(22) Filed: Oct. 12, 2021

(65) Prior Publication Data

US 2022/0127830 A1    Apr. 28, 2022

Related U.S. Application Data

(60) Provisional application No. 63/106,594, filed on Oct. 28, 2020.

(51) Int. Cl.
*E03C 1/04*    (2006.01)

(52) U.S. Cl.
CPC .......... *E03C 1/0412* (2013.01); *E03C 1/0402* (2013.01)

(58) Field of Classification Search
CPC ...... E03C 1/0402; E03C 1/0412; F16K 31/44; F16K 31/602; F16K 31/60
USPC ............... 4/675–678; 137/359, 801; 251/293
See application file for complete search history.

(56) References Cited

U.S. PATENT DOCUMENTS

| | | |
|---|---|---|
| 3,307,422 A | 3/1967 | Olander |
| 4,829,632 A | 5/1989 | Freier et al. |
| 5,361,431 A | 11/1994 | Frier et al. |
| 5,946,746 A | 9/1999 | Bloom |
| 5,947,149 A * | 9/1999 | Mark .................... F16K 31/602 137/359 |
| 6,014,985 A | 1/2000 | Warshawsky |
| 6,186,475 B1 | 2/2001 | Selepouchin |
| 6,370,712 B1 | 4/2002 | Burns et al. |
| 6,434,765 B1 | 8/2002 | Burns et al. |
| 6,874,527 B2 | 4/2005 | Meeder |
| 6,981,286 B2 | 1/2006 | Sallick |

(Continued)

FOREIGN PATENT DOCUMENTS

| | | |
|---|---|---|
| CN | 1185556 A | 6/1998 |
| CN | 101634369 A | 1/2010 |

(Continued)

*Primary Examiner* — Tuan N Nguyen
(74) *Attorney, Agent, or Firm* — Bose McKinney & Evans LLP

(57) ABSTRACT

A faucet handle assembly includes a mounting shank configured to be mounted to a mounting deck. A valve assembly is received within an internal chamber of the mounting shank, and the valve assembly includes a valve stem that is rotatable about a rotation axis to facilitate water flow through the valve assembly. The valve assembly further includes a valve stem adapter that is operably coupled to the valve stem. The faucet handle assembly further includes an upper handle. The upper handle includes a lever that is coupled to the valve stem adapter and the valve stem, and the lever is disposed on a first side of the rotation axis. The upper handle further includes a cover that is coupled to the valve stem adapter and disposed on an opposite second side of the rotation axis. The cover and the lever together obscure the valve stem adapter.

18 Claims, 30 Drawing Sheets

(56) References Cited

U.S. PATENT DOCUMENTS

| | | | |
|---|---|---|---|
| 7,658,202 | B2 | 2/2010 | Mueller et al. |
| 7,987,869 | B2 | 8/2011 | Rosko et al. |
| 8,079,381 | B2 | 12/2011 | Fischer et al. |
| 8,881,755 | B2 | 11/2014 | Thomas et al. |
| 8,985,137 | B2 | 3/2015 | Burgett et al. |
| 9,062,796 | B2 | 6/2015 | Horsman et al. |
| 9,399,859 | B2 | 7/2016 | Allen et al. |
| 9,567,734 | B2 | 2/2017 | Davidson et al. |
| 9,631,740 | B2 | 4/2017 | Farinella et al. |
| 10,428,497 | B2 | 10/2019 | Davidson et al. |
| 10,436,343 | B2 | 10/2019 | Crowe et al. |
| 10,689,835 | B2 | 6/2020 | Davidson et al. |
| 11,001,994 | B2 | 5/2021 | Rosko |
| 11,091,901 | B2 | 8/2021 | Wales et al. |
| 2008/0277611 | A1 | 11/2008 | Esche et al. |
| 2010/0147407 | A1 | 6/2010 | Rosko et al. |
| 2014/0197343 | A1 | 7/2014 | Horsman et al. |
| 2017/0009901 | A1 | 1/2017 | Ritter et al. |
| 2019/0178403 | A1 | 6/2019 | Crowe et al. |
| 2020/0102724 | A1 | 4/2020 | Rosko |
| 2021/0254748 | A1 | 8/2021 | DeVries et al. |

FOREIGN PATENT DOCUMENTS

| | | | |
|---|---|---|---|
| CN | 101680569 | A | 3/2010 |
| CN | 101852306 | A | 10/2010 |
| CN | 106996479 | A | 8/2017 |
| CN | 209800751 | U | 12/2019 |
| FR | 2681661 | A1 | 3/1993 |
| GB | 1352297 | A | 5/1974 |
| GB | 2173834 | A | 10/1986 |
| KR | 101200393 | B1 | 11/2012 |
| WO | 2006/023166 | A2 | 3/2006 |

\* cited by examiner

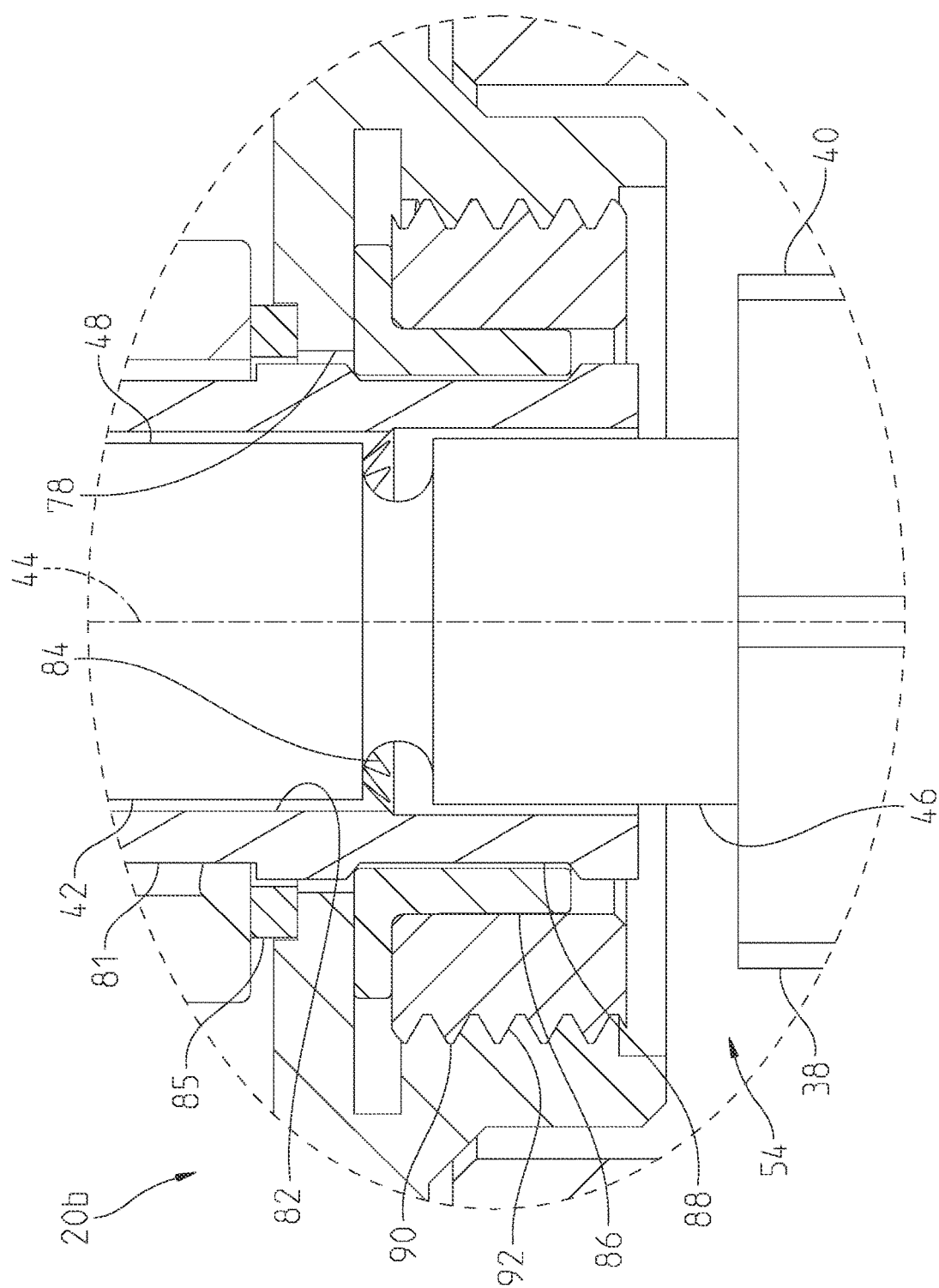

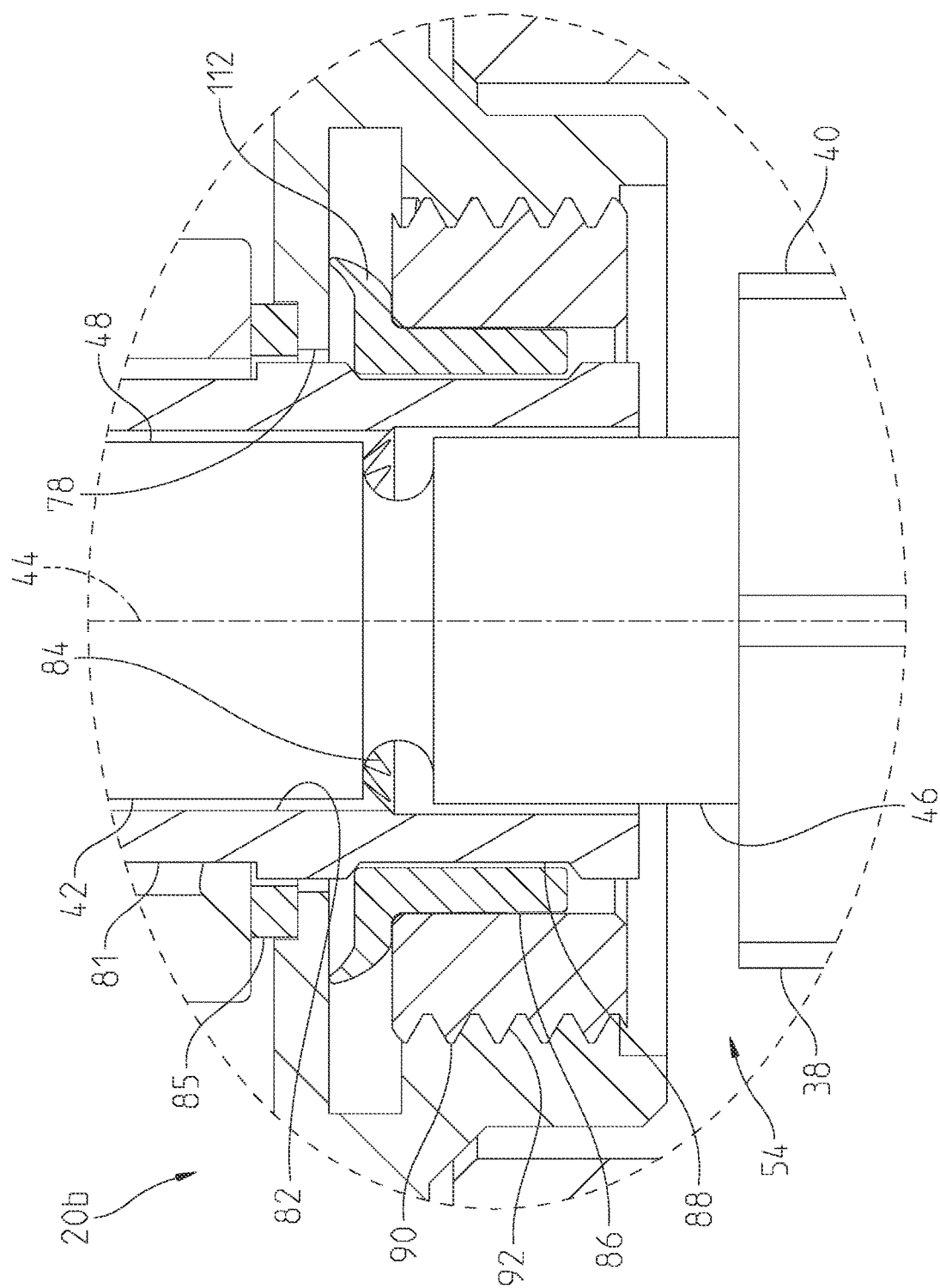

FAUCET HANDLE ASSEMBLY

CROSS-REFERENCE TO RELATED APPLICATION

The present application claims priority to U.S. Provisional Patent Application Ser. No. 63/106,594, filed Oct. 28, 2020, the disclosure of which is expressly incorporated herein by reference.

BACKGROUND AND SUMMARY OF THE DISCLOSURE

The present invention relates generally to a faucet handle assembly and, more particularly, to a faucet handle assembly including components of different materials, including at least one non-standard material.

Conventional handle assemblies for controlling water flow through the outlet of a faucet often include a handle coupled to a rotating valve stem of a flow control valve. A decorative trim or escutcheon may help cover a mounting hole in the sink deck, hide internal faucet handle assembly components, and provide an aesthetically pleasing appearance. In certain designs, it is desirable to provide faucet handles with a material that provides an aesthetically pleasing appearance (e.g., wood, ivory, concrete, and the like). However, faucet handles including these "non-standard" materials are typically difficult to manufacture.

Additionally, conventional handle assemblies having a handle base that threadably couple to a mounting shank typically have several drawbacks. Specifically, such faucet assemblies have a loose or wobbly feel due to excess clearance between splines on the valve stem and the handle, and such faucet assemblies have relatively tall bases to house internal components. Moreover, the handle base can loosen from the mounting shank over time, and handle bases with irregular shapes (that is, non-circular shapes) are difficult to align with other features, such as other handle bases or a spout.

In view of the above, improved faucet handle assemblies would be beneficial.

According to an illustrative embodiment of the present disclosure, a faucet handle assembly includes a valve stem adapter configured to operably couple to a valve stem of a valve assembly. The valve stem adapter is configured to rotate about a rotation axis together with the valve stem to facilitate water flow through the valve assembly. The faucet handle assembly further includes an upper handle. The upper handle includes a lever that is coupled to the valve stem adapter, and the lever is disposed on a first side of the rotation axis. The upper handle further includes a cover that is coupled to the valve stem adapter and disposed on a second side of the rotation axis. The second side is opposite the first side, and the cover and the lever together obscure the valve stem adapter.

According to another illustrative embodiment of the present disclosure, a faucet handle assembly includes a mounting shank that is configured to be mounted to a mounting deck. The mounting shank includes an internal chamber. A valve assembly is received within the internal chamber of the mounting shank, and the valve assembly includes a valve stem that is rotatable to facilitate water flow through the valve assembly. A handle base is coupled to the mounting shank. A nut is threadably coupled to the handle base. A bearing is coupled to the nut. A valve stem adapter is coupled to the bearing for rotation relative to the handle base, and the valve stem adapter is operably coupled to the valve stem. An upper handle includes a lever that is operably coupled to the valve stem adapter and the valve stem.

According to yet another illustrative embodiment of the present disclosure, a faucet handle assembly includes a mounting shank that is configured to be mounted to a mounting deck. The mounting shank includes an internal chamber. A valve assembly is received within the internal chamber of the mounting shank, and the valve assembly includes a valve stem that is rotatable to facilitate water flow through the valve assembly. A handle base is coupled to the mounting shank. A nut is coupled to the handle base. A bearing is coupled to the nut. A valve stem adapter is coupled to the bearing for rotation relative to the handle base, and the valve stem adapter is operably coupled to the valve stem. The faucet handle assembly further includes an upper handle. The upper handle includes a lever that is coupled to the valve stem adapter and the valve stem. The upper handle further includes a cover that is coupled to the valve stem adapter. The cover and the lever together obscure the valve stem adapter.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which:

FIG. 7A is a detail partial sectional view of the faucet handle assembly within line 7 of FIG. 3;

FIG. 7B is a detail partial sectional view of the faucet handle assembly showing an alternative embodiment bearing cooperating with the valve stem;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
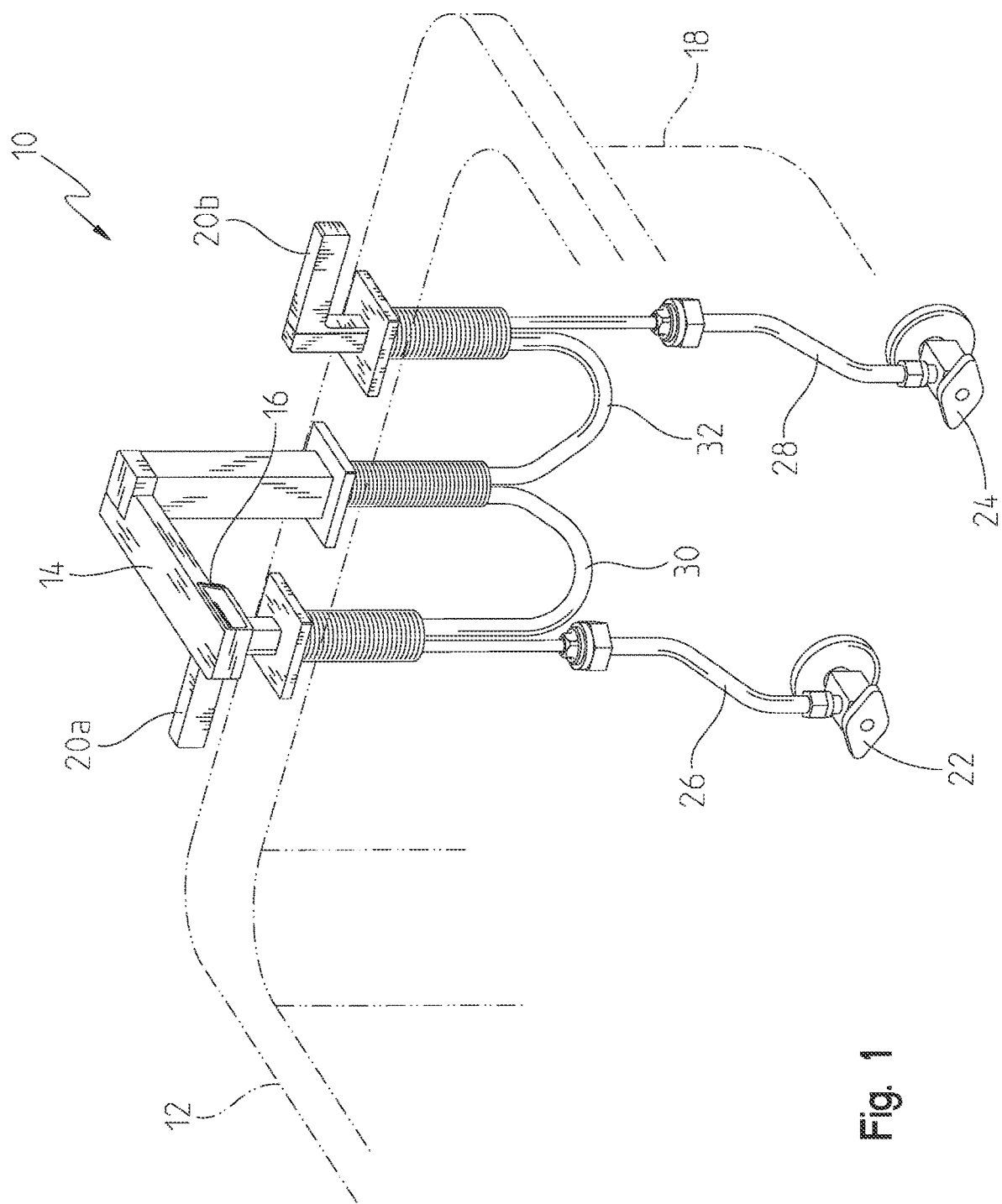
FIG. 1 is a perspective view of an illustrative faucet including a faucet handle assembly according to an embodiment of the present disclosure.

Referring initially to FIG. 1, an illustrative faucet 10 is shown coupled to a mounting deck, such as a sink deck 12. The faucet 10 illustratively includes a delivery spout 14 defining a water outlet 16 for discharging water into a sink basin 18 surrounded by the sink deck 12. Illustratively, a hot water faucet handle assembly 20a and a cold water faucet handle assembly 20b are illustratively mounted on the sink deck 12 in spaced relation to, and on opposite sides of, the spout 14. Hot water is supplied from a hot water source 22 (illustratively, a conventional hot water stop) to the hot water faucet handle assembly 20a, while cold water is supplied from a cold water source 24 (illustratively, a conventional cold water stop) to the cold water faucet handle assembly 20b.

Illustratively, hot water and cold water inlet conduits 26 and 28 fluidly couple the hot and cold water sources 22 and 24 to the hot water and cold water faucet handle assemblies 20a and 20b, respectively. The hot water and cold water inlet conduits 26 and 28 are illustratively formed of a flexible tubular material, such as a polymer (e.g., a cross-linked polyethylene (PEX)). As is known, the faucet handle assemblies 20a and 20b control water flow to the water outlet 16 of the delivery spout 14. More particularly, the delivery spout 14 is fluidly coupled to outlets of the hot water and cold water faucet handle assemblies 20a and 20b via hot water and cold water outlet conduits 30 and 32, respectively. The hot water and cold water outlet conduits 30 and 32 are illustratively formed of a flexible tubular material, such as a polymer (e.g., a cross-linked polyethylene (PEX)).

In the following detailed description and accompanying drawings, the cold water faucet handle assembly 20b is illustrated and described in further detail. However, the faucet handle assemblies 20a and 20b are substantially identical except for their relative rotation during operation (e.g., counter-clockwise from an off position to a full water flow position for the hot water faucet handle assembly 20a, and clockwise from an off position to a full water flow position for the cold water faucet handle assembly 20b).

Figure 2:
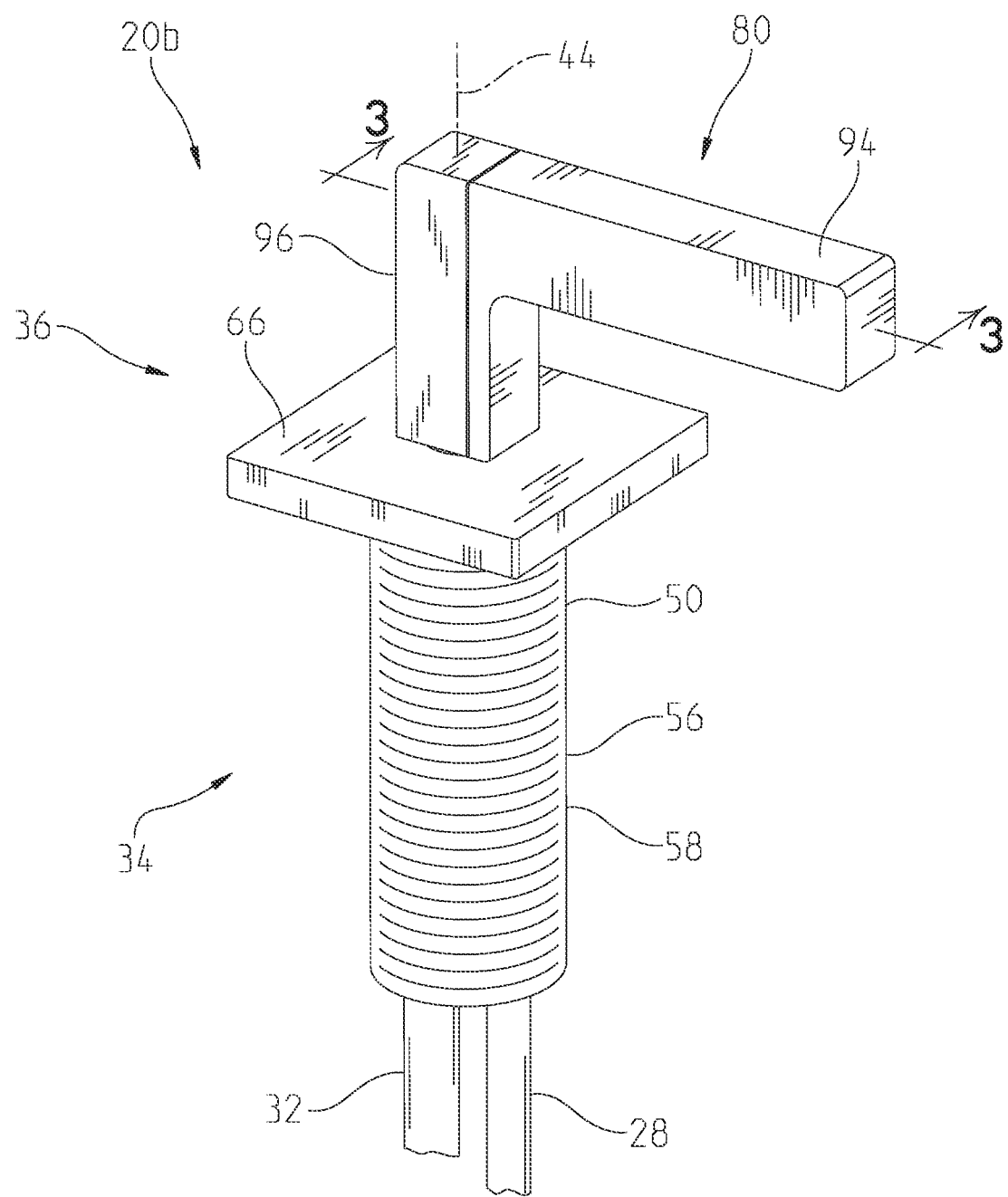
FIG. 2 is a perspective view of an illustrative faucet handle assembly of the faucet of FIG. 1.
Figure 3:
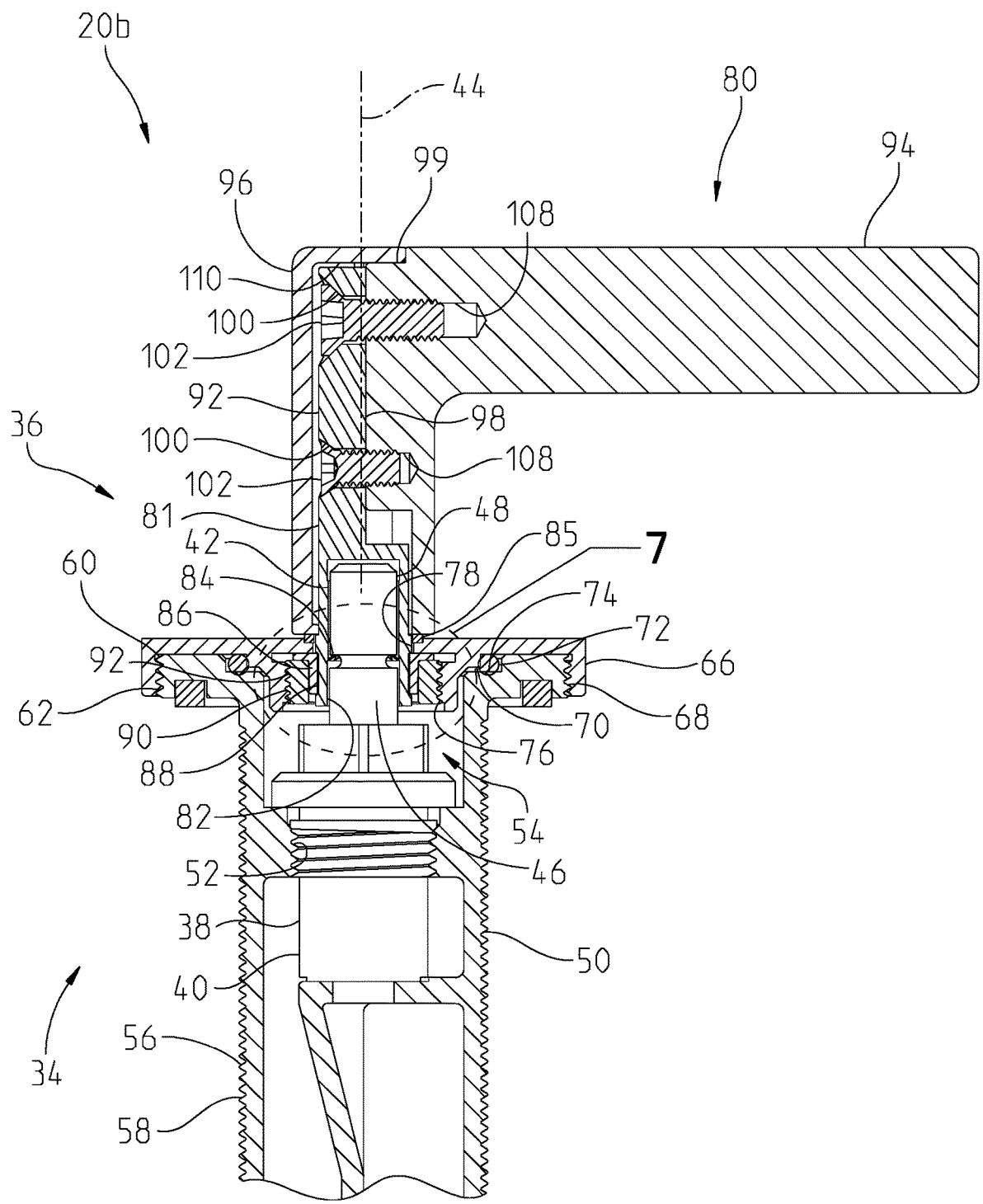
FIG. 3 is a partial sectional view of the faucet handle assembly along line 3-3 of FIG. 2.

With reference now to FIGS. 2-7A, the faucet handle assembly 20b illustratively includes a lower portion 34 extending below the sink deck 12 (shown elsewhere), and an upper portion 36 extending above the sink deck 12. The lower portion 34 illustratively includes a flow control valve or valve assembly 38 (FIGS. 3-5 and 7) fluidly coupled to the water inlet conduit 28 and the water outlet conduit 32 (FIG. 2). The illustrative valve assembly 38 includes a valve housing 40 and a valve stem 42. The valve stem 42 is rotatable relative to the valve housing 40 about a rotation axis 44 (FIG. 3) in a first direction (e.g., clockwise) and an opposite second direction (e.g., counter-clockwise) to permit and inhibit, respectively, water flow through the valve assembly 38. The valve stem 42 illustratively includes a body 46 supporting an upwardly extending externally splined shaft 48. In some embodiments, the valve assembly 38 may be of the type further detailed in U.S. Pat. No. 8,881,755 to Thomas et al., the disclosure of which is expressly incorporated herein by reference.

The illustrative valve assembly 38 is carried by a mounting shank 50, more specifically by internal threads 52 (FIG. 3) in an internal chamber 54 of the mounting shank 50. The mounting shank 50 also includes a lower shaft 56 that extends through a mounting aperture (not shown) in the sink deck 12 (shown elsewhere). The lower shaft 56 includes lower external threads 58 that couple to a mounting nut (not shown) for securing the mounting shank 50 to the sink deck 12. An upper flange 60 of the mounting shank 50 is supported above the sink deck 12. The upper flange 60 includes upper external threads 62.

The upper portion 36 of the faucet handle assembly 20b illustratively includes a handle base or escutcheon 66 that is carried by the mounting shank 50. More specifically, the handle base 66 includes outer internal threads 68 that couple to the upper external threads 62 of the mounting shank 50. Inwardly of the outer internal threads 68, the handle base 66 includes an annular shoulder surface 70. The annular shoulder surface 70 carries and compresses an o-ring 72 against the mounting shank 50, more specifically, into an annular recess 74 of the mounting shank 50. The annular shoulder surface 70 is coupled to inner internal threads 76, which facilitate supporting other components of the upper portion 36 of the faucet handle assembly 20b as described in further detail below. Inwardly of the inner internal threads 76, the handle base 66 includes a through opening 78 through which the valve stem 42 extends.

The illustrative upper portion 36 of the faucet handle assembly 20b further includes an upper handle 80 that is operably coupled to the valve stem 42 via a valve stem adapter or handle post 81. The valve stem adapter 81 includes a lower blind opening 82 that receives the valve stem 42. The lower opening 82 illustratively includes an internally splined surface 84 (FIGS. 3 and 7) for coupling to the externally splined shaft 48 of the valve stem 42. Adjacent to the lower opening 82, the valve stem adapter 81 is supported for rotation relative to the handle base 66 and about the rotation axis 44. Illustratively, the valve stem adapter 81 is rotatably supported by a glide ring 85 and a bearing 86, such as, for example, a split ring bearing. The valve stem adapter 81 includes an annular groove 88 that receives the bearing 86. Opposite the annular groove 88, the bearing 86 is carried by a nut 90, such as, for example, a spanner nut, and the nut 90 compresses the bearing 86 against the valve stem adapter 81. The nut 90 includes external threads 92 that couple to the inner internal threads 76 of the handle base 66.

As shown in the illustrative embodiment of FIG. 7B, the bearing 86 may include an arcuate upper flange 112. The upper flange 112 is illustratively flexible and engages a lower surface of the handle base 66 to help bias the valve stem 42 (via the valve stem adapter 81, for example) downwardly, thereby providing constant tension on the upper portion 36 of the faucet handle assembly 20b above the handle base 66.

Referring specifically to FIGS. 3-6, the illustrative valve stem adapter 81 includes an upper mounting portion 92 opposite the lower opening 82. The upper mounting portion 92 couples the valve stem adapter 81 to a primary handle portion or lever 94 and a secondary handle portion or cover 96 of the upper handle 80. Illustratively, the upper mounting portion 92 includes a lever mounting surface or side surface 98 that abuts a protrusion or boss 99 of the lever 94. The upper mounting portion 92 also includes one or more through openings 100 that extend through the side surface 98. Each opening 100 receives a fastener 102 for securing the lever 94 to the upper mounting portion 92. Adjacent to the side surface 98, the upper mounting portion 92 includes one or more grooves 104 for coupling to one or more rails 106 of the cover 96. Illustratively, the grooves 104 and rails 106 slidably couple the cover 96 to the valve stem adapter 81 in a direction that is substantially parallel to the rotation axis 44. In other embodiments, the upper mounting portion 92 includes one or more rails 106 for coupling to one or more grooves 104 of the cover 96.

With continued reference to FIGS. 3-6, the lever 94 is graspable and rotatable to rotate the valve stem adapter 81 and the valve stem 42 relative to the valve housing 40 and thereby open and close the valve assembly 38. The boss 99 of the lever 94 includes one or more threaded blind openings 108 for receiving the fasteners 102 and thereby coupling the lever 94 to the valve stem adapter 81. The lever 94 may be formed of a material that provides an aesthetically pleasing appearance. Illustratively, the lever 94 is formed of a metal and, accordingly, the fasteners 102 are metal screws. Alternatively, the lever 94 may be formed of different materials, including "non-standard" materials (e.g., wood, ivory, concrete, and the like) and "standard" materials (e.g., brass, zinc, stainless steel, and the like). Illustratively, the lever 94 has a general horizontal "L" shape that extends perpendicularly away from the rotation axis 44. Alternatively, the lever 94 may have different shapes.

The illustrative cover 96 includes an inner chamber 110 that receives the valve stem adapter 81. Illustratively, the cover 96 has a general linear shape that is elongated along the rotation axis 44 of the valve stem 42. Alternatively, the cover 96 may have different shapes. The cover 96 may be formed of any of various materials including materials similar to, or distinct from, the lever 94.

The lever 94 and the cover 96 together obscure the valve stem adapter 81, and the lever 94 and the cover 96 together provide the upper handle 80 with a generally continuous appearance. The lever 94 and the cover 96 are generally disposed on opposite sides of the rotation axis 44 of the valve stem 42. More specifically, the majority of the lever 94 is disposed on a first side of the rotation axis 44, and the majority of the cover 96 is disposed on a second side of the rotation axis 44. Due to these positions and the shapes described above, the majority of the upper handle 80 may be provided, in some embodiments, as the aesthetically appealing material of the lever 94. More specifically, in some embodiments the lever 94 may provide substantially 72 percent of the external surface area of the upper handle 80 (that is, 72 percent±5 percent).

Figure 4:
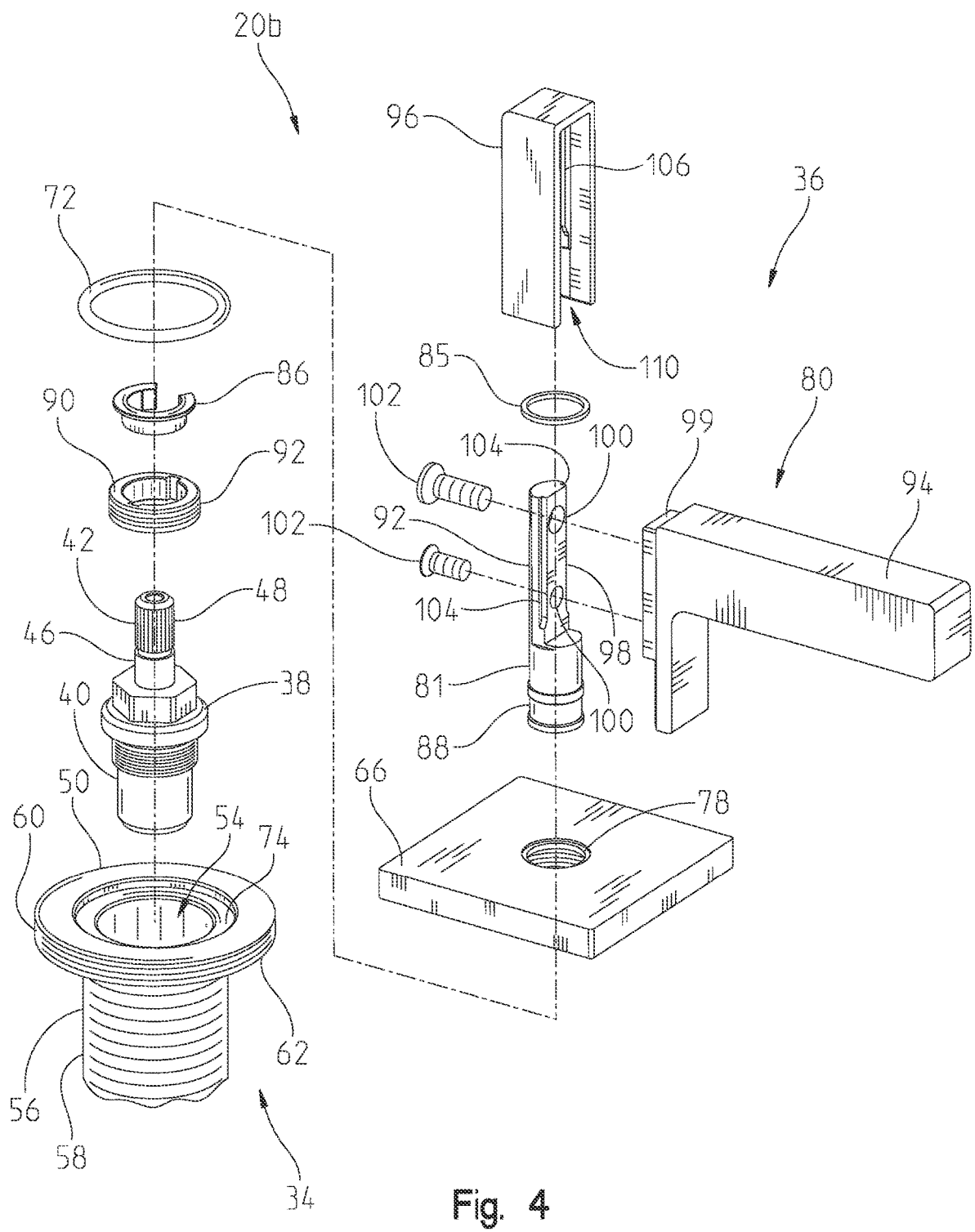
FIG. 4 is a top exploded perspective view of the faucet handle assembly of FIG. 2.
Figure 5:
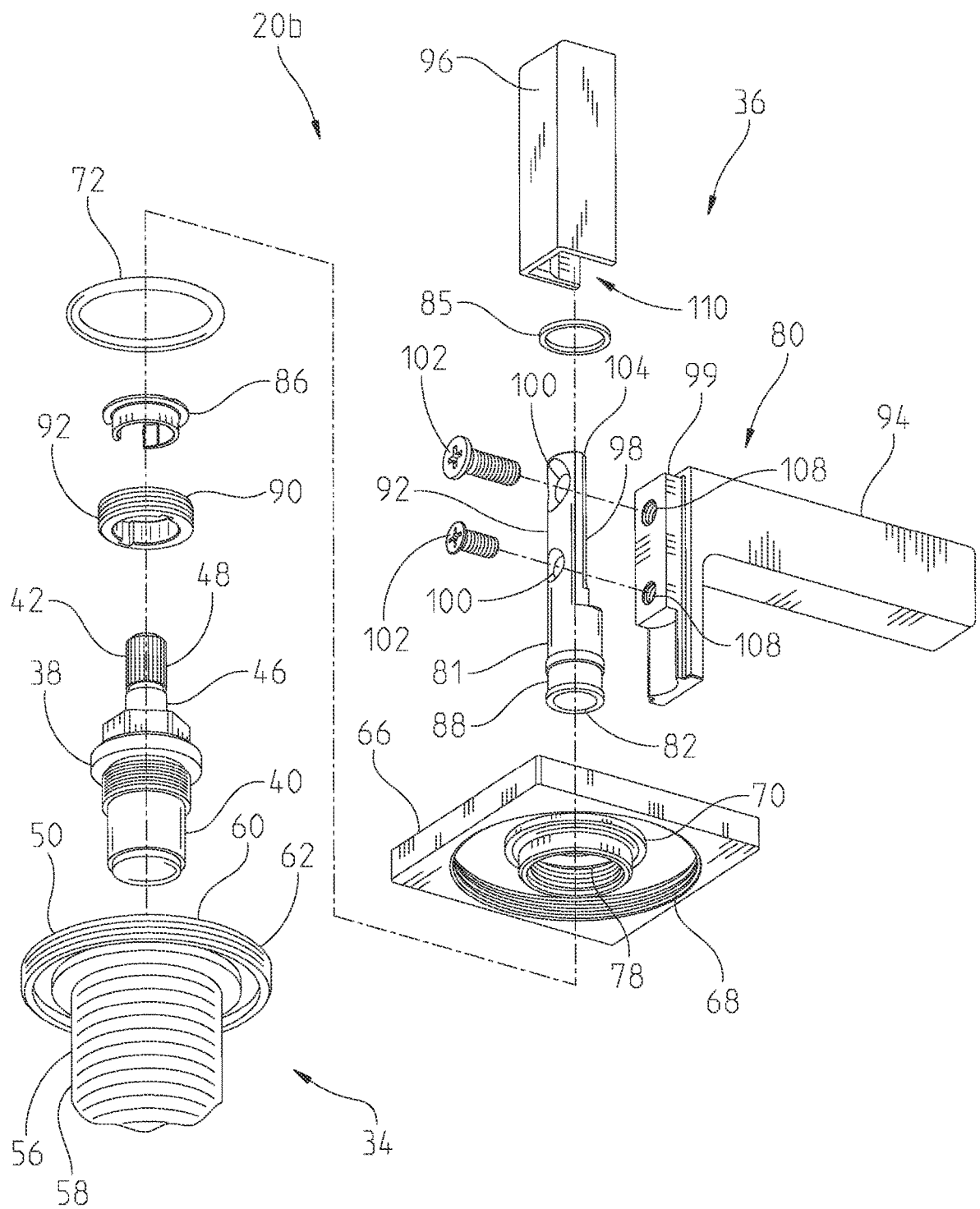
FIG. 5 is a bottom exploded perspective view of the faucet handle assembly of FIG. 2.
Figure 6:
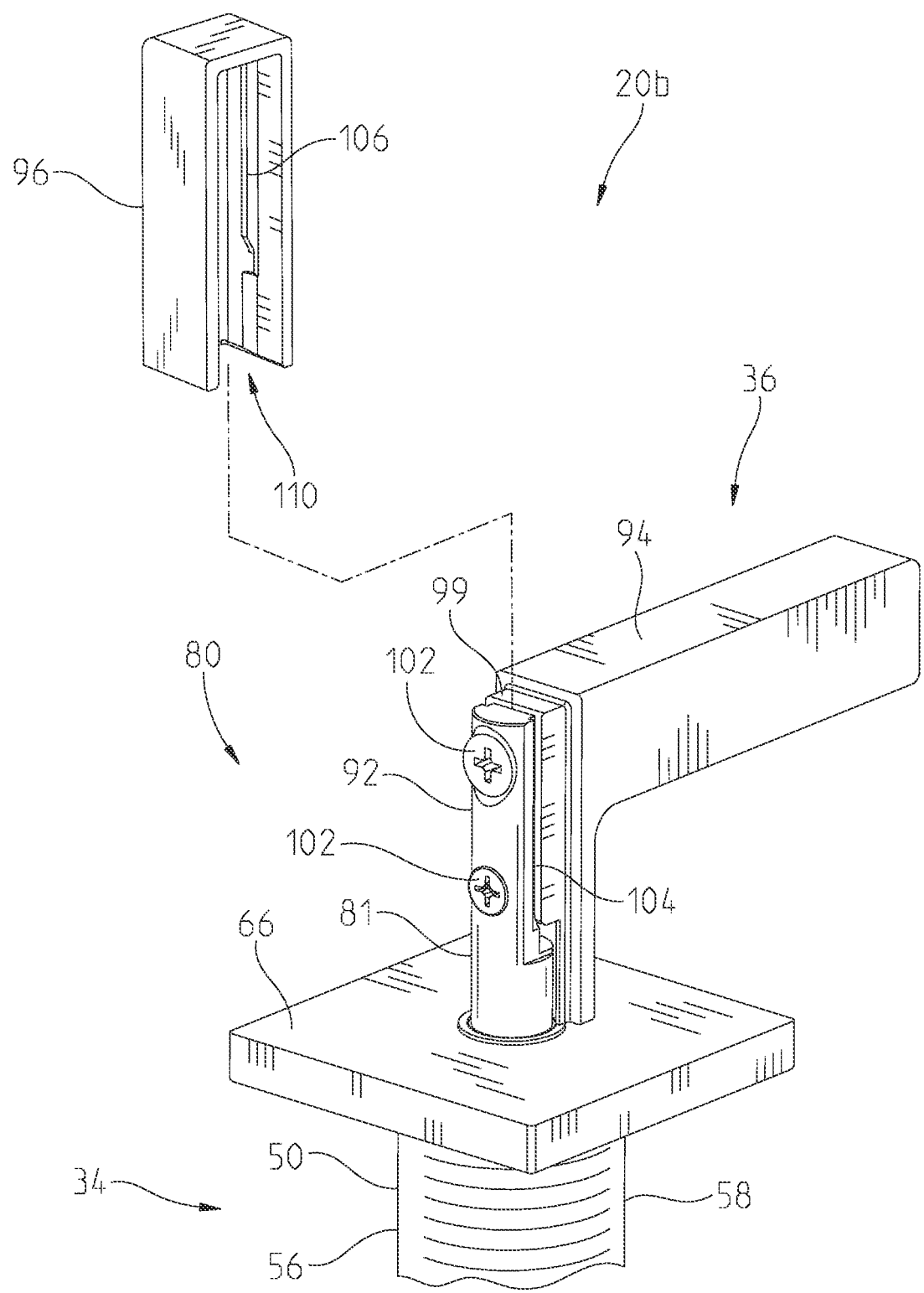
FIG. 6 is a top exploded perspective view of a cover and a lever of the faucet handle assembly of FIG. 2.

With specific reference to the exploded views of FIGS. 4 and 5, the upper portion 36 of the faucet handle assembly 20b may be assembled as follows. First, the lever 94 is coupled to the valve stem adapter 81 by the fasteners 102. Next, the glide ring 85 is coupled to the valve stem adapter 81. The valve stem adapter 81 is then inserted in the through opening 78 of the handle base 66, and the split ring bearing 86 is inserted in the annular groove 88 of the valve stem adapter 81. Next, the spanner nut 90 is coupled and tightening into the valve stem adapter 81 to secure the upper handle 80 to the handle base 66. The o-ring 72 is then installed on the handle base 66.

The components and features described above provide the faucet handle assembly 20b with various advantages. For example, the radial compression provided by the bearing 86 and the nut 90 against the valve stem adapter 81 compensate for tolerances and reduce or eliminate a loose feel when lifting on the upper handle 80. In addition, the radial compression provides tension on the valve stem adapter 81 which inhibits the valve stem adapter 81 from tending to tilt or wobble due to the clearance between the splined shaft 48 of the valve stem 42 and the splined surface 84 of the valve stem adapter 81. As another example, the nut 90 and the bearing 86 have relatively short heights and are positioned in the handle base 66 and the mounting shank 50 in a manner that permits the handle base 66 to have a relatively short height. As yet another example, the o-ring 72 is compressed between the handle base 66 and the mounting shank 50, which facilitates adjustment of the handle base 66 on the mounting shank 50 (either by tightening or loosening). Stated another way, the o-ring 72 facilitates maintaining compression between the mounting shank 50 and the handle base 66 while allowing fine tuning of the orientation of the handle base 66. As a result, the handle base 66 may be provided with a non-circular shape (illustratively, a square shape) that is relatively easily aligned with other features of the faucet 10, such as other faucet handle assembly 20a or the spout 14.

Figure 8:
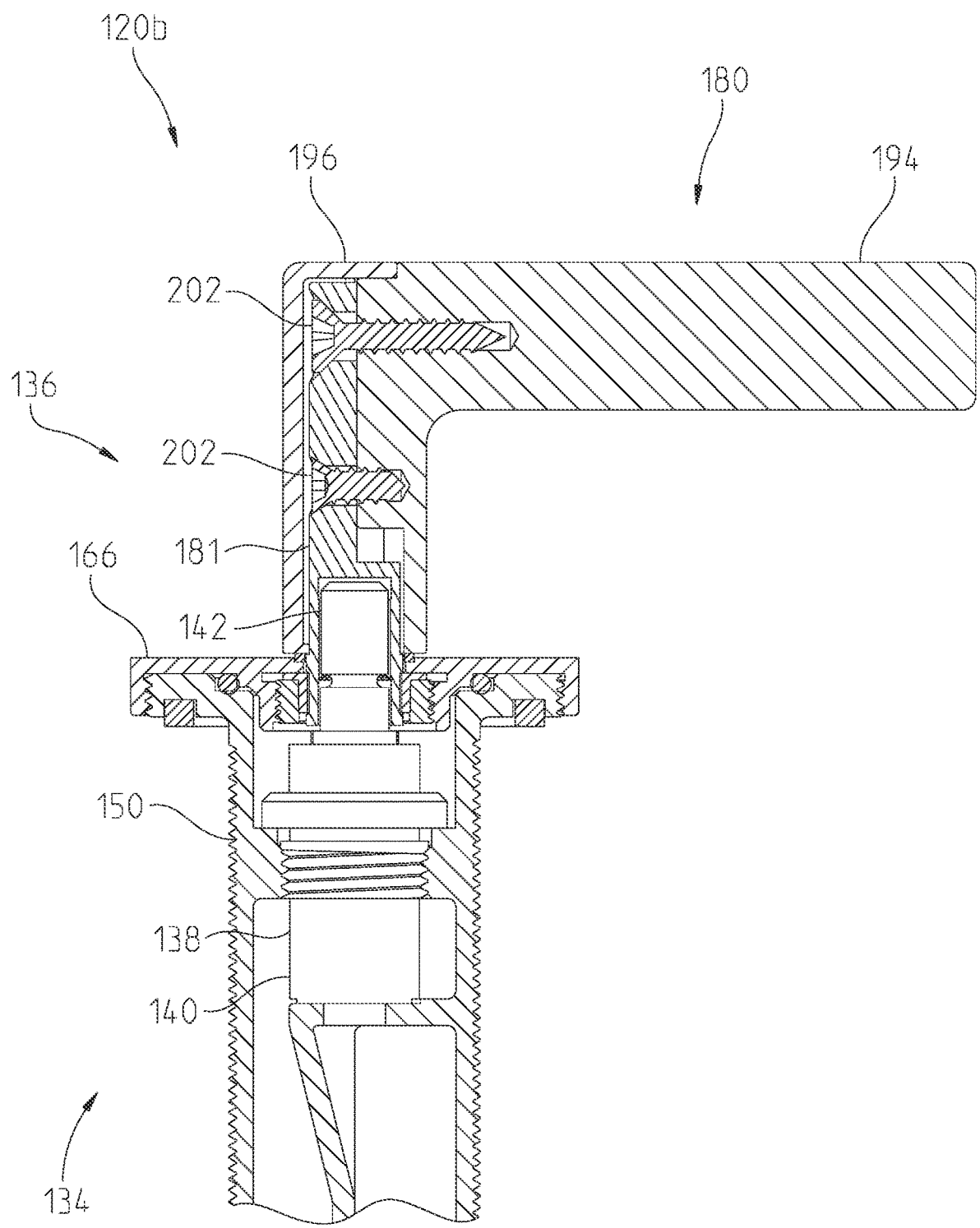
FIG. 8 is a sectional view of a faucet handle assembly according to another embodiment of the present disclosure.
Figure 9:
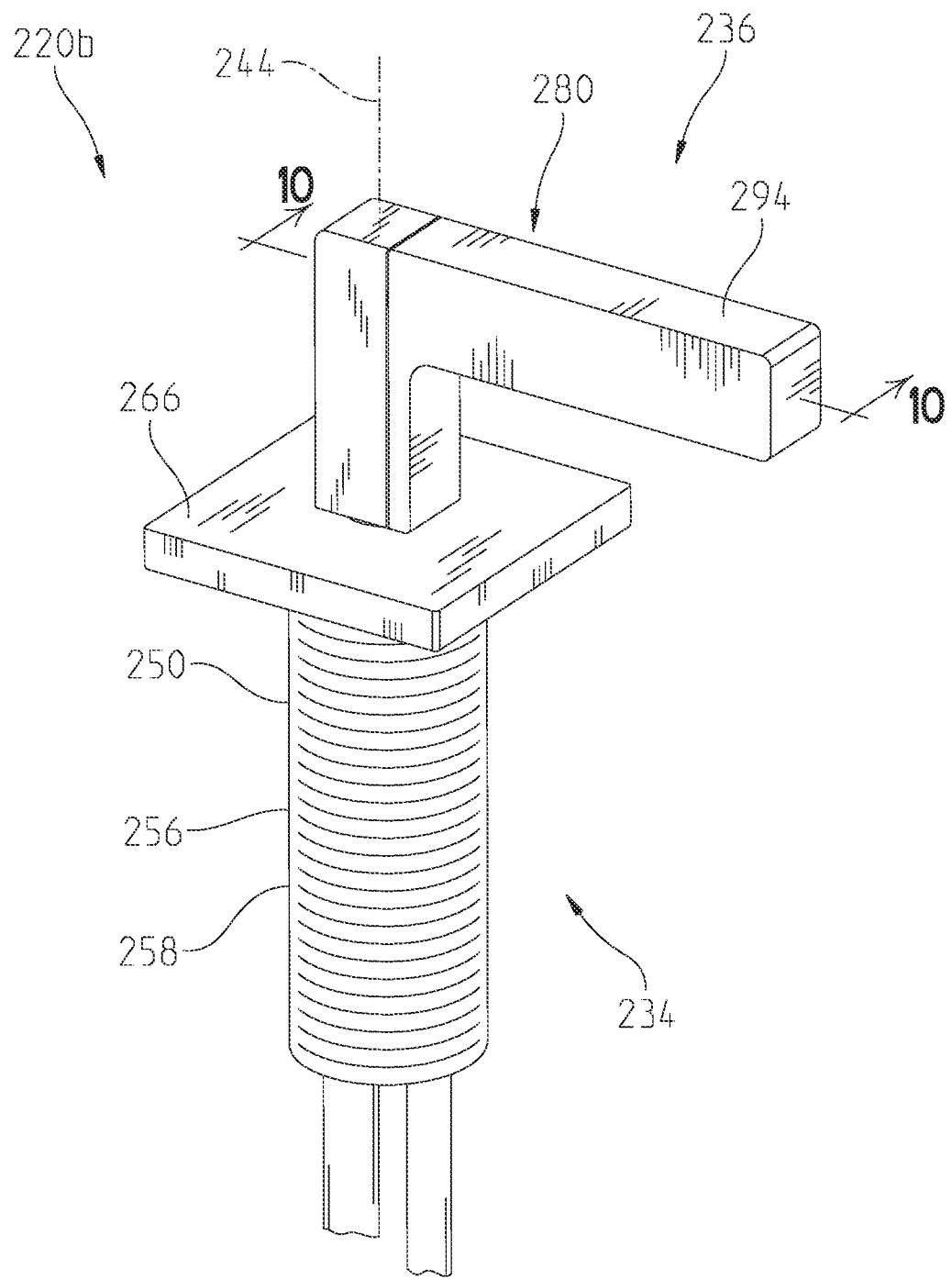
FIG. 9 is a perspective view of a faucet handle assembly according to another embodiment of the present disclosure.

Another illustrative embodiment of a faucet handle assembly 120b is shown in FIG. 8 in partial section. The faucet handle assembly 120b may be used as part of the faucet 10 instead of the faucet handle assembly 20b. The faucet handle assembly 120b is illustratively shown as a cold water faucet handle. However, the faucet 10 may additionally or alternatively include a substantially identical hot water faucet handle assembly (not shown—i.e., identical except for its relative rotation during operation). The faucet handle assembly 120b includes many of the same elements as the faucet handle assembly 20b detailed above. As such, in the following description, like components are identified with similar reference numbers. The faucet handle assembly 120b includes a lower portion 134 extending below the sink deck 12 (shown elsewhere), and an upper portion 136 extending above the sink deck 12. The lower portion 134 illustratively includes a flow control valve or valve assembly 138, which includes a valve housing 140 and a rotatable valve stem 142. The valve assembly 138 is carried by a mounting shank 150. The upper portion 136 of the handle assembly 120b includes a handle base 166 and an upper handle 180 operably coupled to the valve stem 142. The upper handle 180 includes a valve stem adapter 181 that couples to a primary handle portion or lever 194 and a secondary handle portion or cover 196. Illustratively, the lever 194 is formed of wood, more specifically teak, and fasteners 202, more specifically wood screws, couple the lever 194 to the valve stem adapter 181.

Another illustrative embodiment of a faucet handle assembly 220b is shown in FIGS. 9-12. The faucet handle assembly 220b may be used as part of the faucet 10 instead of the faucet handle assembly 20b. The faucet handle assembly 220b is illustratively shown as a cold water faucet handle. However, the faucet 10 may additionally or alternatively include a substantially identical hot water faucet handle assembly (not shown—i.e., identical except for its relative rotation during operation). The faucet handle assembly 220b includes a lower portion 234 extending below the sink deck 12 (shown elsewhere), and an upper portion 236 extending above the sink deck 12. The lower portion 234 illustratively includes a flow control valve or valve assembly 238, which includes a valve housing 240 and a valve stem 242. The valve stem 242 is rotatable relative to the valve housing 240 about a rotation axis 244 (FIG. 10) in a first direction (e.g., clockwise) and an opposite second direction (e.g., counter-clockwise) to permit and inhibit, respectively, water flow through the valve assembly 238.

The illustrative valve assembly 238 is carried by a mounting shank 250, more specifically by internal threads 252 in an internal chamber 254 of the mounting shank 250. The mounting shank 250 also includes a lower shaft 256 that extends through a mounting aperture (not shown) in the sink deck 12 (shown elsewhere). The lower shaft 256 includes lower external threads 258 that couple to a mounting nut (not shown) for securing the mounting shank 250 to the sink deck 12. An upper flange 260 of the mounting shank 250 is supported above the sink deck 12. The upper flange 260 includes upper external threads 262.

The upper portion 236 of the faucet handle assembly 220b includes a handle base or escutcheon 266 that is carried by the mounting shank 250. More specifically, the handle base 266 includes internal threads 268 (FIG. 10) that couple to the upper external threads 262 of the mounting shank 250. Inwardly of the outer internal threads 268, the handle base 266 includes a through opening 278 through which the valve stem 242 extends. The upper portion 236 of the faucet handle assembly 220b further includes an upper handle 280 that is operably coupled to the valve stem 242 via a valve stem adapter or handle post 281. The valve stem adapter 281 includes a lower blind opening 282 (FIG. 10) that receives the valve stem 242. The lower opening 282 illustratively includes an internally splined surface 284 for coupling to the externally splined shaft 248 of the valve stem 242. Adjacent to the lower opening 282, the valve stem adapter 281 is supported for rotation relative to the handle base 266 and about the rotation axis 244. Illustratively, the valve stem adapter 281 is rotatably supported by a glide ring 211 carried by the handle base 266 and a bushing 213 carried within the internal chamber 254 of the mounting shank 250. A spring 215, such as a wave washer, is disposed between the glide ring 211 and the bushing 213 to maintain engagement between an upper flange 217 of the bushing 213 and a lower flange 219 of the valve stem adapter 281 and thereby urge the valve stem adapter 281 toward the valve assembly 238.

Figure 10:
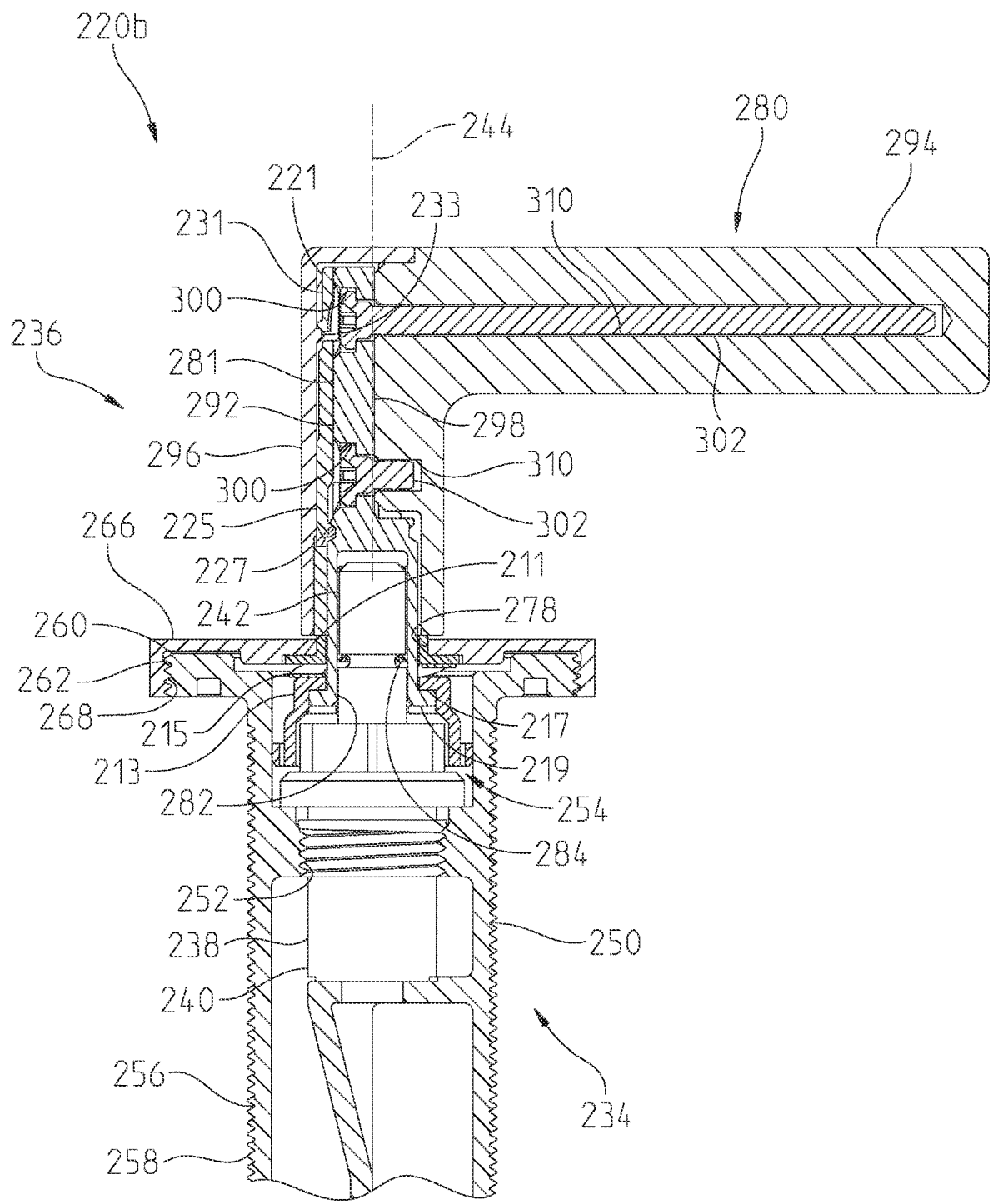
FIG. 10 is a partial sectional view of the faucet handle assembly along line 10-10 of FIG. 9.
Figure 11:
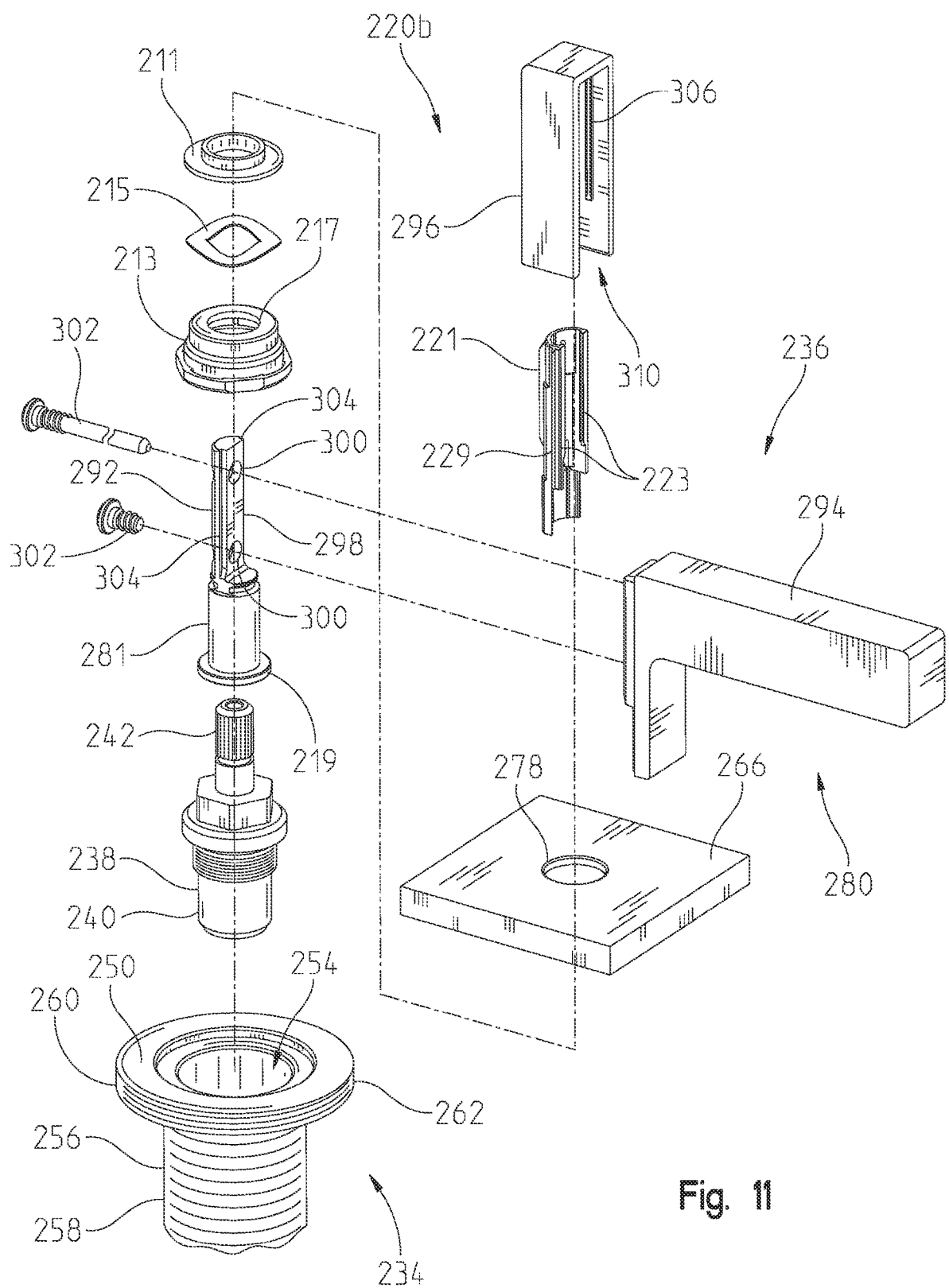
FIG. 11 is a top exploded perspective view of the faucet handle assembly of FIG. 9.
Figure 12:
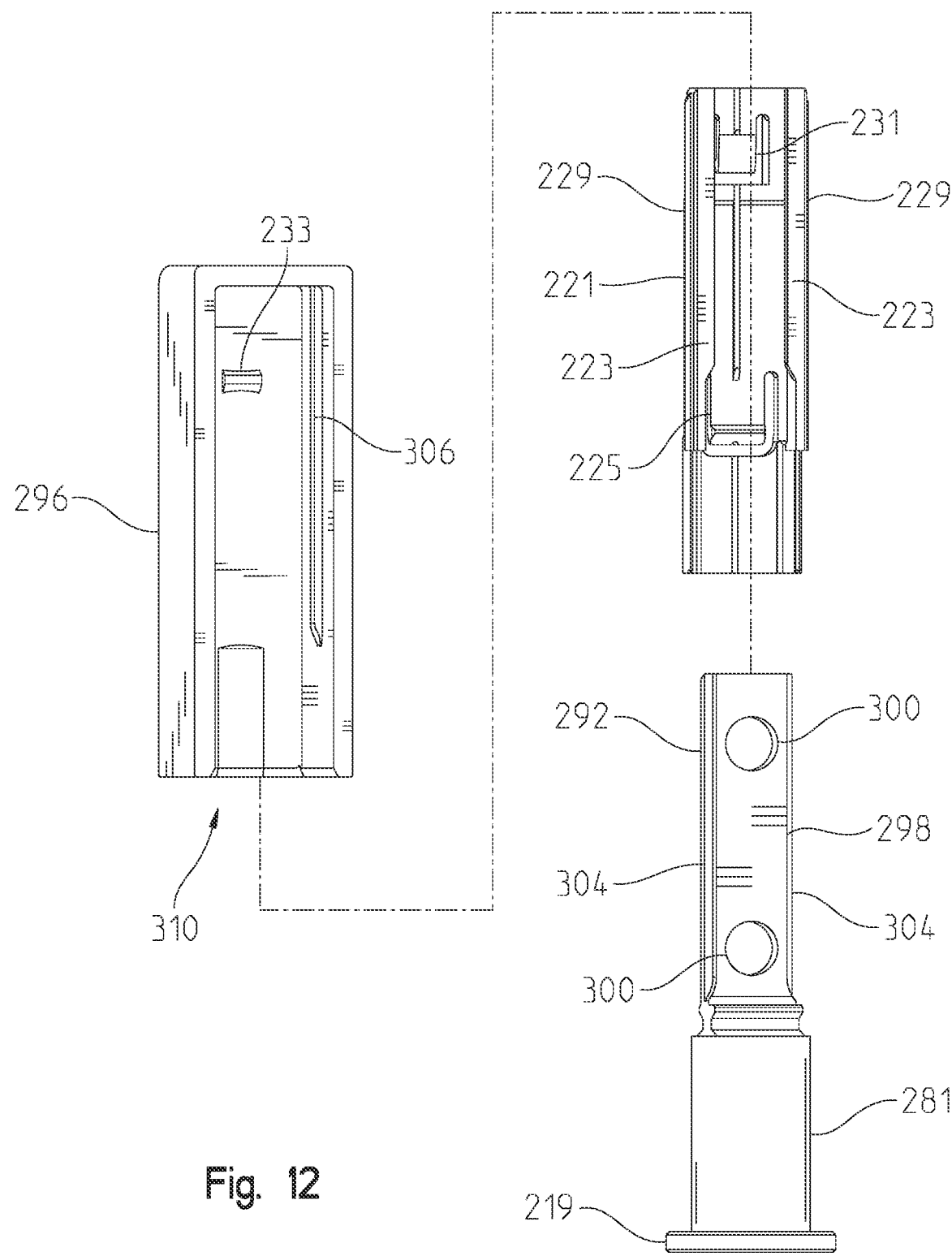
FIG. 12 is a side exploded perspective view of a valve stem adapter, a retainer, and a cover of the faucet handle assembly of FIG. 9.

Referring specifically to FIGS. 10-12, the illustrative valve stem adapter 281 includes an upper mounting portion 292 opposite the lower opening 282. The upper mounting portion 292 couples the valve stem adapter 281 to a primary handle portion or lever 294 and a secondary handle portion or cover 296 via a retainer 221. Illustratively, the upper mounting portion 292 includes a lever mounting surface or side surface 298 that abuts the lever 294. The upper mounting portion 292 also includes one or more through openings 300 that extend through the side surface 298. Each opening 300 receives a fastener 302 for securing the lever 294 to the upper mounting portion 292. Adjacent to the side surface 298, the upper mounting portion 292 includes one or more grooves 304 for coupling to one or more internal rails 223 of the retainer 221. Illustratively, the grooves 304 and rails 223 slidably couple the retainer 221 to the valve stem adapter 281 in a direction that is substantially parallel to the rotation axis 244. In other embodiments, the upper mounting portion 292 includes one or more rails 223 for coupling to one or more grooves 304 of the retainer 221. The upper mounting portion 292 and the retainer 221 include securing features for securing the retainer 221 to the upper mounting portion 292. As illustrated, the securing features may include a cantilevered finger 225 carried by the retainer 221 and a ridge 227 (FIG. 10) carried by the upper mounting portion 292 and engaged by the cantilevered finger 225. Alternatively, the securing features may take other forms.

With continued reference to FIGS. 10-12, the illustrative retainer 221 further includes one or more external rails 229 for coupling to one or more rails 306 of the cover 296. Illustratively, the rails 229, 306 slidably couple the cover 296 to the retainer 221 in a direction that is substantially parallel to the rotation axis 244. In other embodiments, one of the retainer 221 and the cover 296 includes one or more grooves (not shown) for receiving the rails 229, 306 of the other of the retainer 221 and the cover 296. The retainer 221 and the cover 296 include securing features for securing the cover 296 to the retainer 221. As illustrated, the securing features may include a cantilevered finger 231 (FIGS. 10 and 12) carried by the retainer 221 and a ridge 233 carried by the cover 296 and engaged by the finger 231. Alternatively, the securing features may take other forms.

The lever 294 is graspable and rotatable to rotate the valve stem adapter 281 and the valve stem 242 relative to the valve housing 240 and thereby open and close the valve assembly 238. The lever 294 includes one or more blind openings 308 (FIG. 10) for receiving the fasteners 302 and thereby coupling the lever 294 to the valve stem adapter 281. The lever 294 may be formed of various materials, including non-standard materials (e.g., wood, ivory, concrete, and the like) and standard materials (e.g., brass, zinc, stainless steel, and the like). Illustratively, the lever 294 has a general horizontal "L" shape that extends perpendicularly away from the rotation axis 244. Alternatively, the lever 294 may have different shapes.

The illustrative cover 296 includes an inner chamber 310 that receives the retainer 221 and the valve stem adapter 281. Illustratively, the cover 296 has a general linear shape that is elongated along the rotation axis 244 of the valve stem 242. Alternatively, the cover 296 may have different shapes. The cover 296 may be formed of any of various materials.

The lever 294 and the cover 296 together obscure the valve stem adapter 281, and the lever 294 and the cover 296 together provide the upper handle 280 with a generally continuous appearance. The lever 294 and the cover 296 are generally disposed on opposite sides of the rotation axis 244 of the valve stem 266. More specifically, the majority of the lever 294 is disposed on a first side of the rotation axis 244, and the majority of the cover 296 is disposed on a second side of the rotation axis 244. Due to these positions and the shapes described above, the majority of the upper handle 280 may be provided, in some embodiments, as the aesthetically appealing material of the lever 294. More specifically, in some embodiments the lever 294 may provide substantially 72 percent of the external surface area of the upper handle 280 (that is, 72 percent±5 percent).

Figure 13:
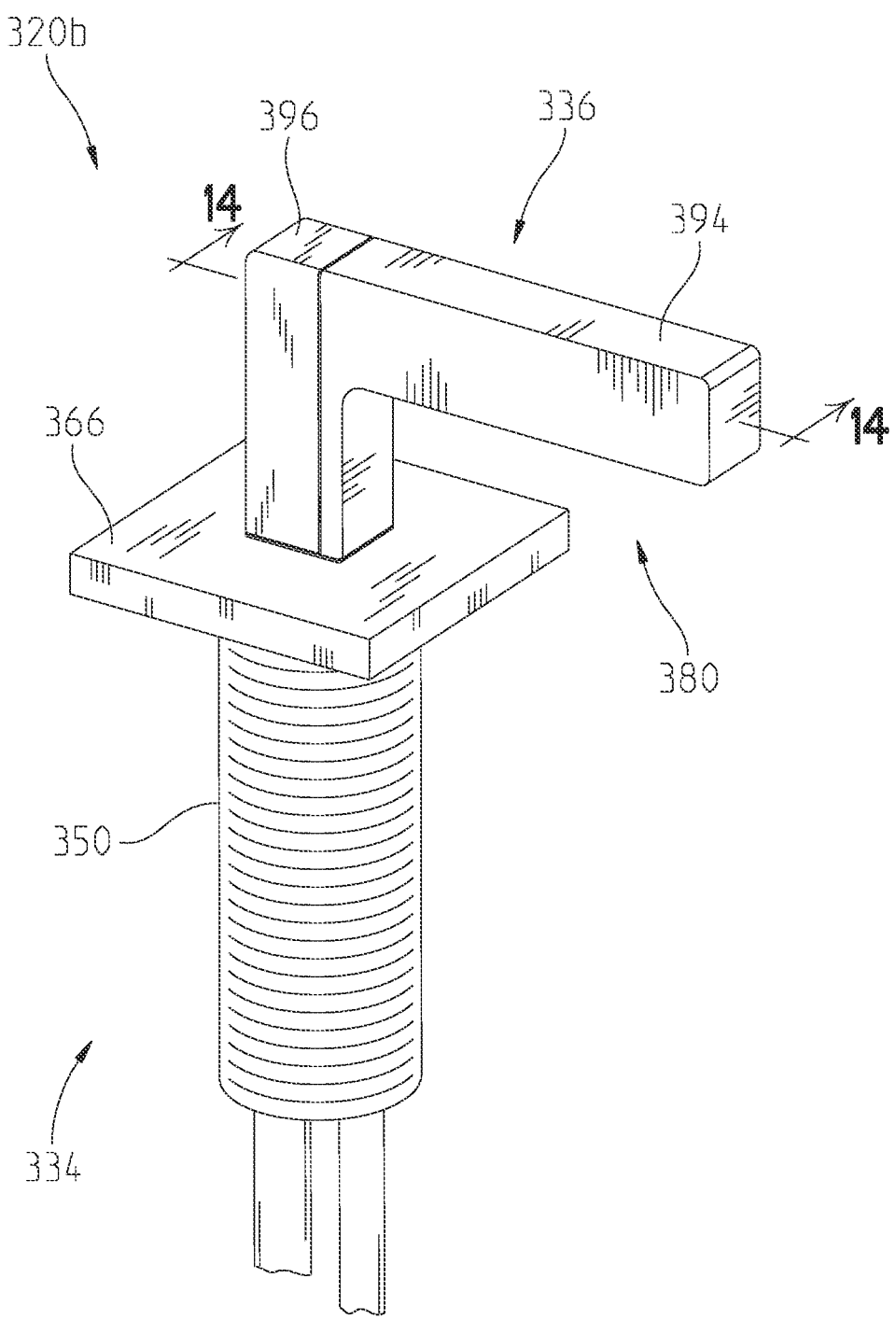
FIG. 13 is a perspective view of a faucet handle assembly according to another embodiment of the present disclosure.
Figure 14:
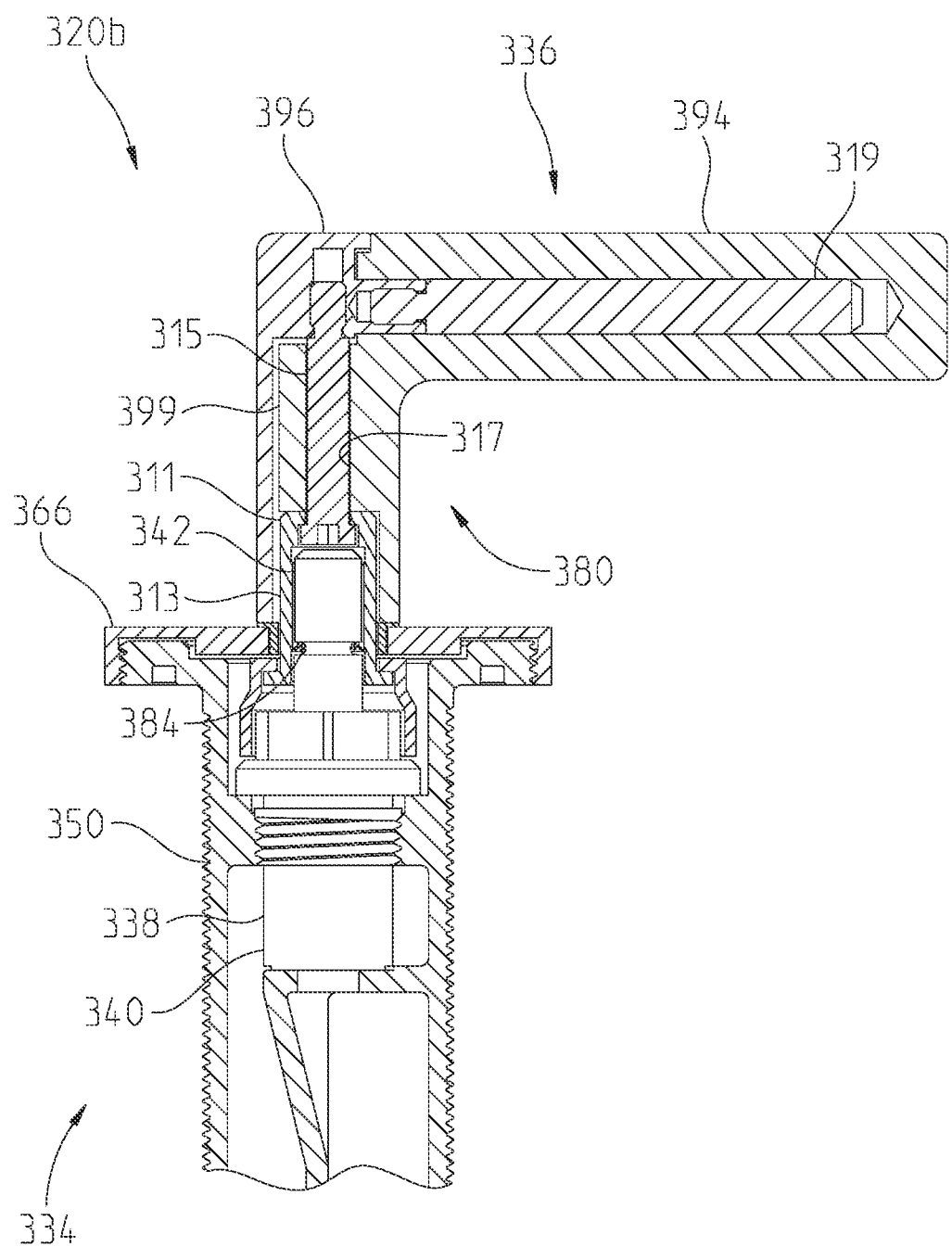
FIG. 14 is a partial sectional view of the faucet handle assembly along line 14-14 of FIG. 13.
Figure 15:
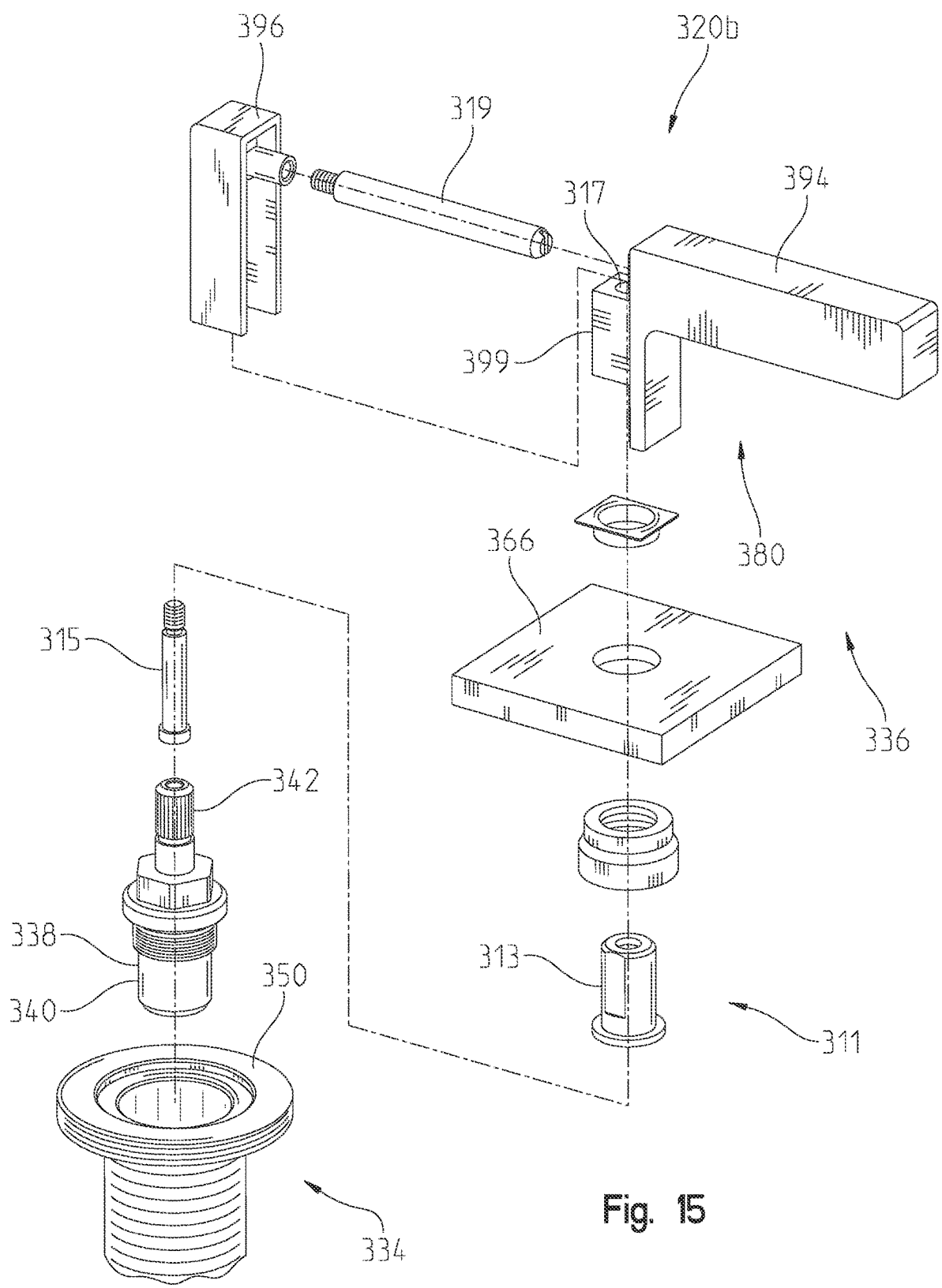
FIG. 15 is a top exploded perspective view of the faucet handle assembly of FIG. 13.

Another illustrative embodiment of a faucet handle assembly 320b is shown in FIGS. 13-15. The faucet handle assembly 320b may be used as part of the faucet 10 instead of the faucet handle assembly 20b. The faucet handle assembly 320b is illustratively shown as a cold water faucet handle. However, the faucet 10 may additionally or alternatively include a substantially identical hot water faucet handle assembly (not shown—i.e., identical except for its relative rotation during operation). The faucet handle assembly 320b includes many of the same elements as the faucet handle assembly 220b detailed above. As such, in the following description, like components are identified with similar reference numbers. The faucet handle assembly 320b includes a lower portion 334 extending below the sink deck 12 (shown elsewhere), and an upper portion 336 extending above the sink deck 12. The lower portion 334 illustratively includes a flow control valve or valve assembly 338, which includes a valve housing 340 and a rotatable valve stem 342. The valve assembly 338 is carried by a mounting shank 350. The upper portion 336 of the handle assembly 320b includes a handle base 366 and an upper handle 380 operably coupled to the valve stem 342. The upper handle 380 includes a valve stem adapter 311 that couples to a primary handle portion or lever 394 and a secondary handle portion or cover 396. The valve stem adapter 311 is formed by an adapter base 313 that couples to the valve stem 342, illustratively, via a splined surface 384 (FIG. 14). The valve stem adapter 311 also includes a fastener 315 that extends through and upwardly from the adapter base 313. The fastener 315 extends through a passageway 317 formed in a boss 399 of the lever 394 and threadably engages the cover 396. The cover 396 and the lever 394 are also coupled by a horizontally extending fastener 319.

Figure 16:
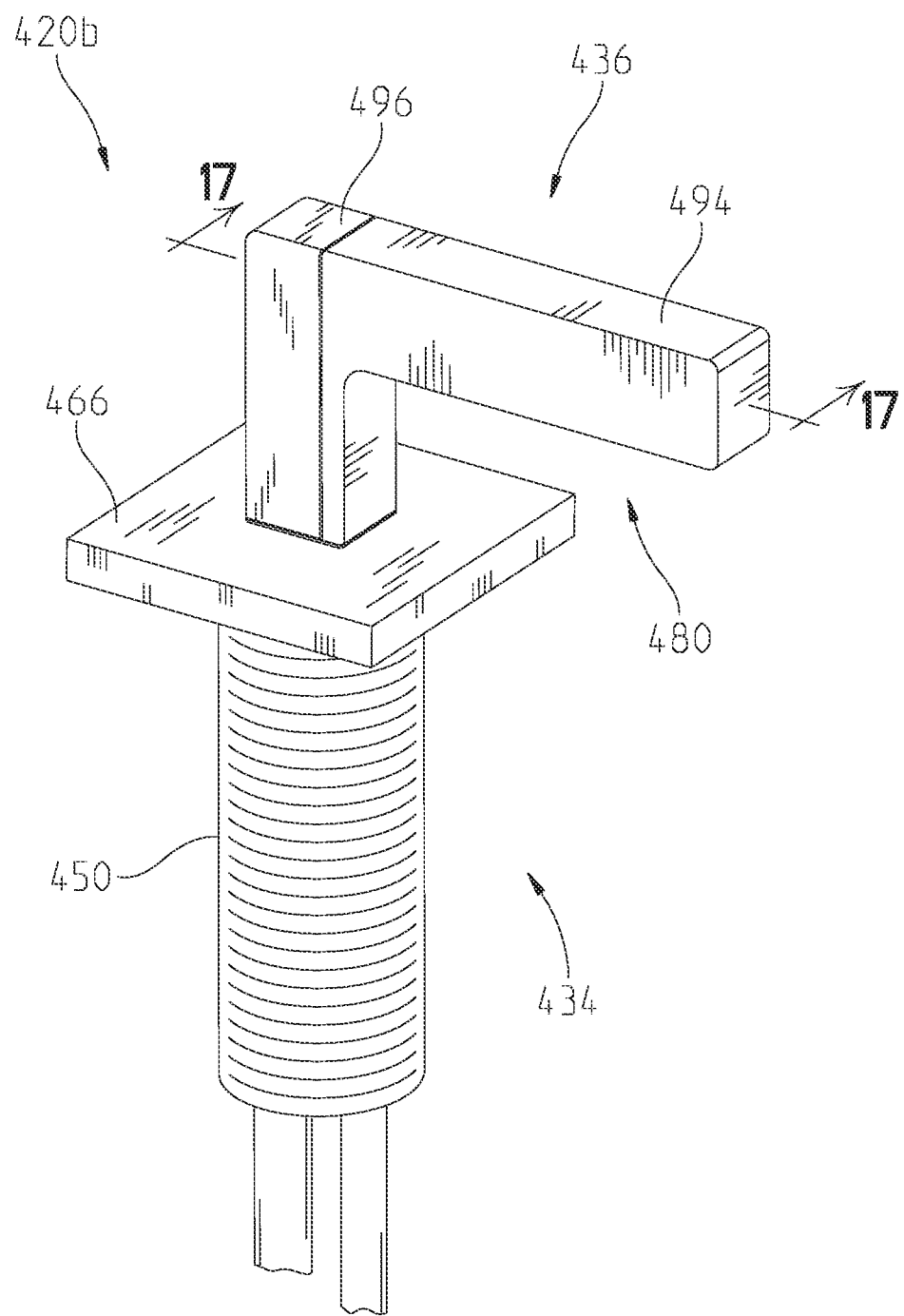
FIG. 16 is a perspective view of a faucet handle assembly according to another embodiment of the present disclosure.
Figure 17:
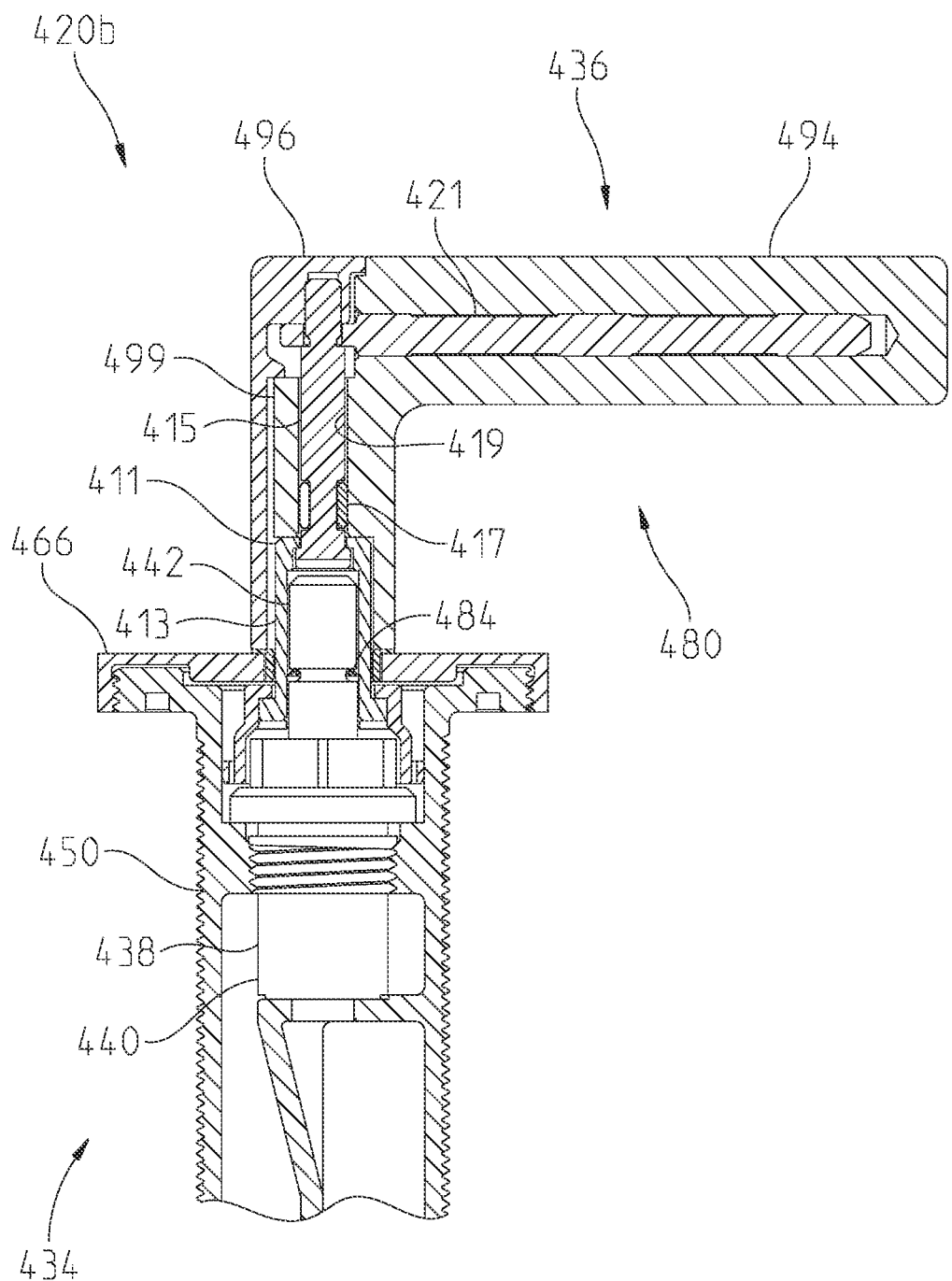
FIG. 17 is a partial sectional view of the faucet handle assembly along line 17-17 of FIG. 16.
Figure 18:
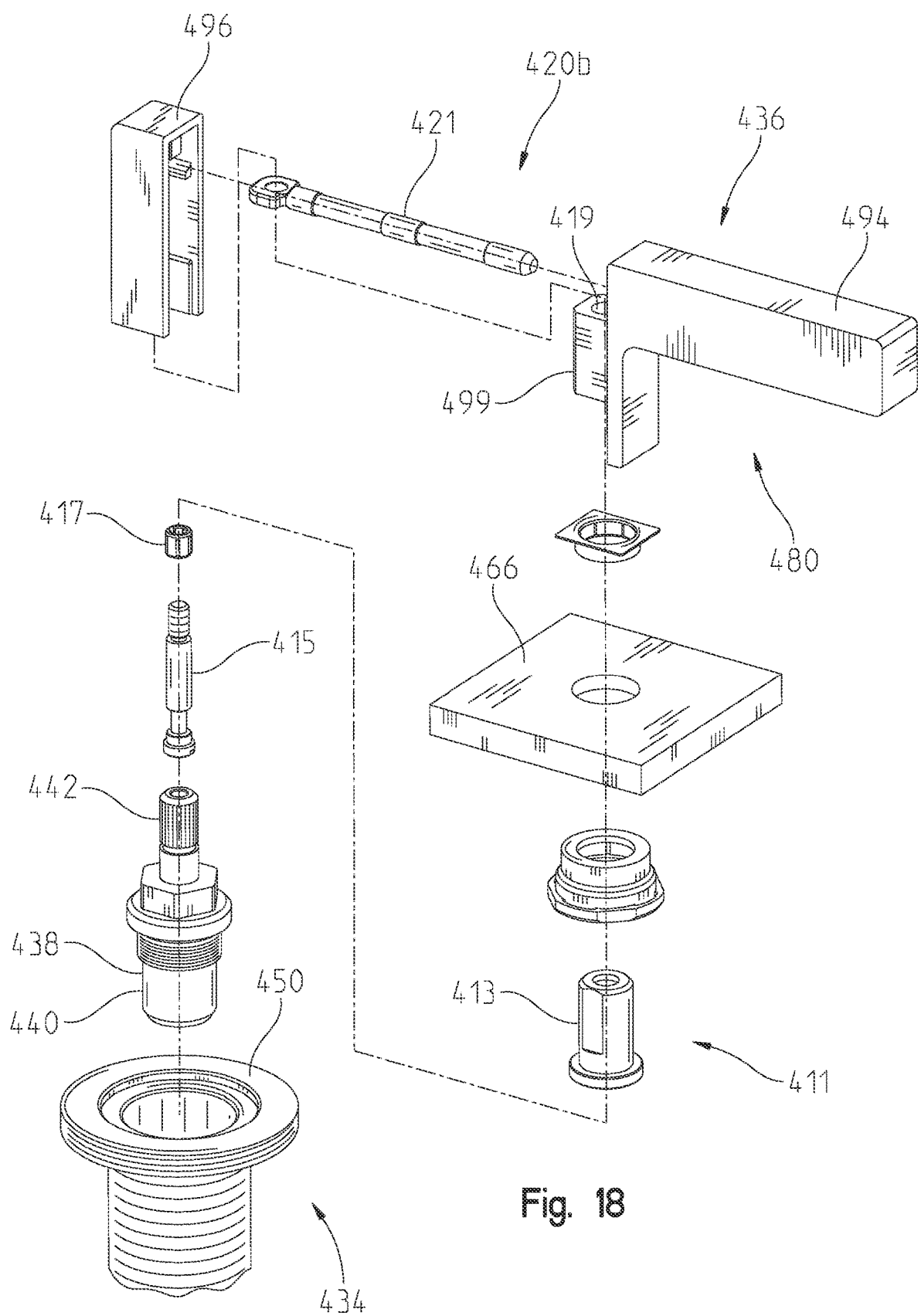
FIG. 18 is a top exploded perspective view of the faucet handle assembly of FIG. 16.

Another illustrative embodiment of a faucet handle assembly 420b is shown in FIGS. 16-18. The faucet handle assembly 420b may be used as part of the faucet 10 instead of the faucet handle assembly 20b. The faucet handle assembly 420b is illustratively shown as a cold water faucet handle. However, the faucet 10 may additionally or alternatively include a substantially identical hot water faucet handle assembly (not shown—i.e., identical except for its relative rotation during operation). The faucet handle assembly 420b includes many of the same elements as the faucet handle assembly 220b detailed above. As such, in the following description, like components are identified with similar reference numbers. The faucet handle assembly 420b includes a lower portion 434 extending below the sink deck 12 (shown elsewhere), and an upper portion 436 extending above the sink deck 12. The lower portion 434 illustratively includes a flow control valve or valve assembly 438, which includes a valve housing 440 and a rotatable valve stem 442. The valve assembly 438 is carried by a mounting shank 450. The upper portion 436 of the handle assembly 420b includes a handle base 466 and an upper handle 480 operably coupled to the valve stem 442. The upper handle 480 includes a valve stem adapter 411 that couples to a primary handle portion or lever 494 and a secondary handle portion or cover 496. The valve stem adapter 411 is formed by an adapter base 413 that couples to the valve stem 442, illustratively, via a splined surface 484 (FIG. 17). The valve stem adapter 411 also includes a fastener 415 that extends through and upwardly from the adapter base 413. The fastener 415 extends through a spacer 417 carried in a passageway 419 of a boss 499 of the lever 494. The fastener 415 also extends through a horizontally extending fastener 421 coupled to the lever 494, and the fastener 415 threadably engages the cover 496.

Figure 19:
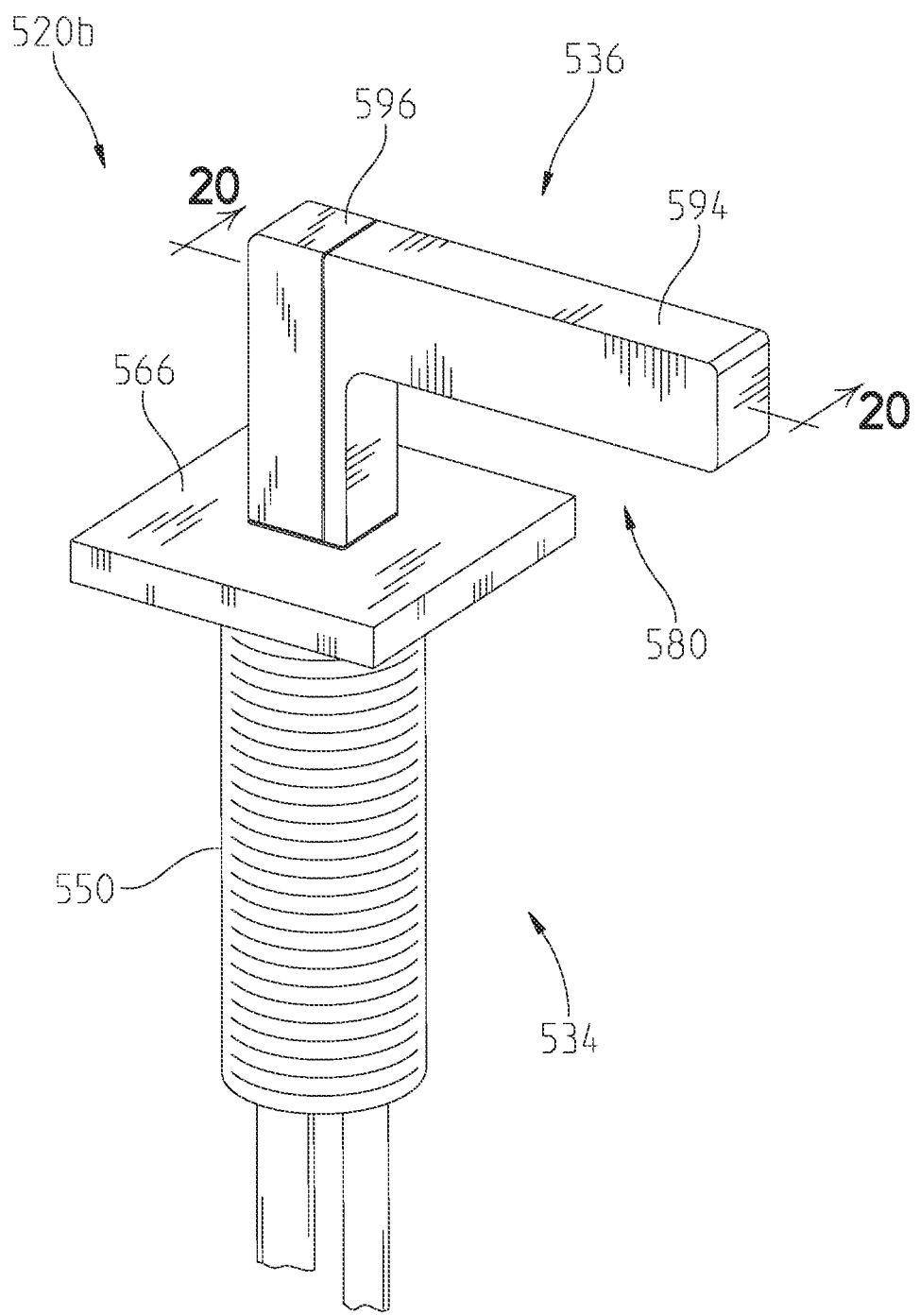
FIG. 19 is a perspective view of a faucet handle assembly according to another embodiment of the present disclosure.
Figure 20:
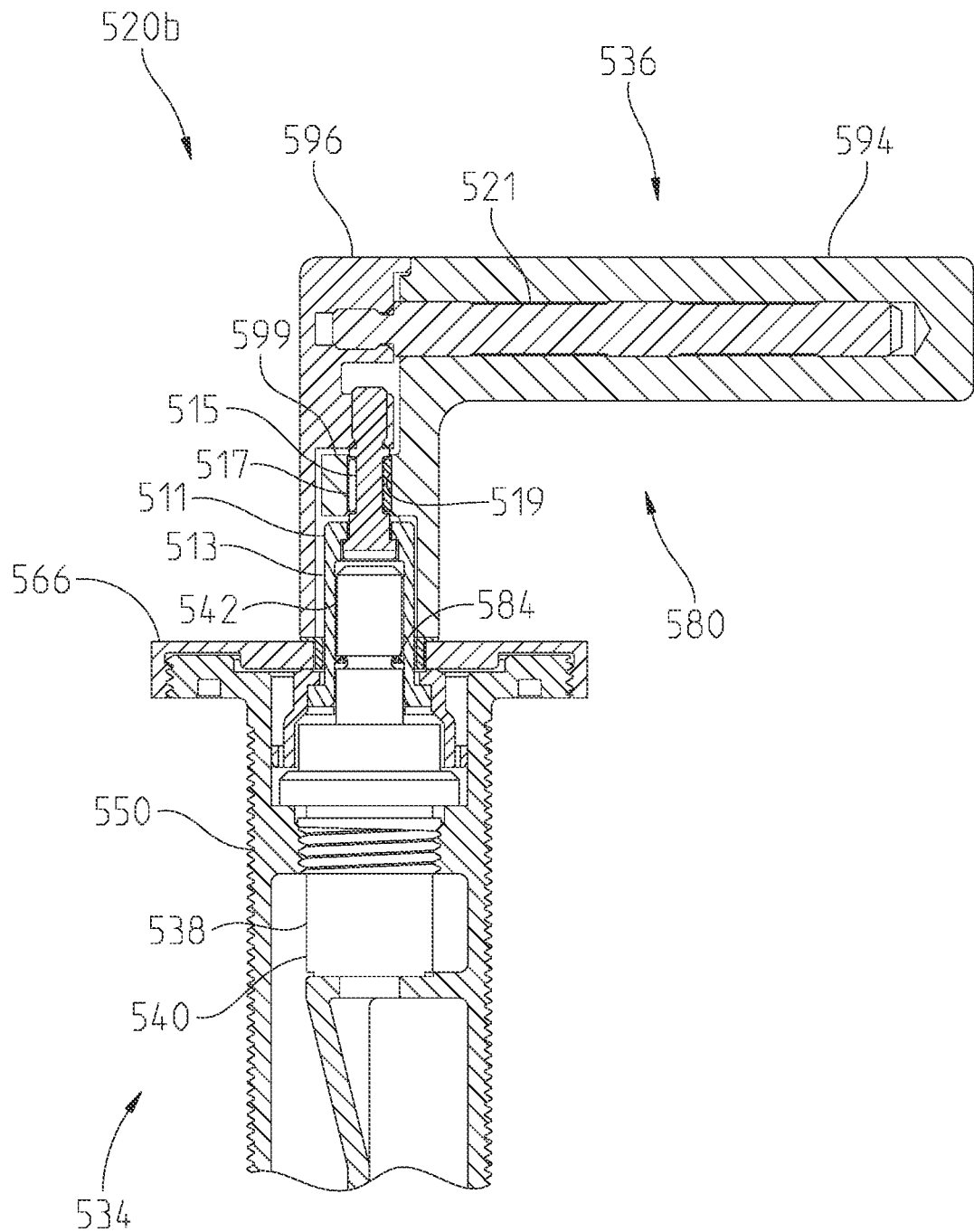
FIG. 20 is a partial sectional view of the faucet handle assembly along line 20-20 of FIG. 19.
Figure 21:
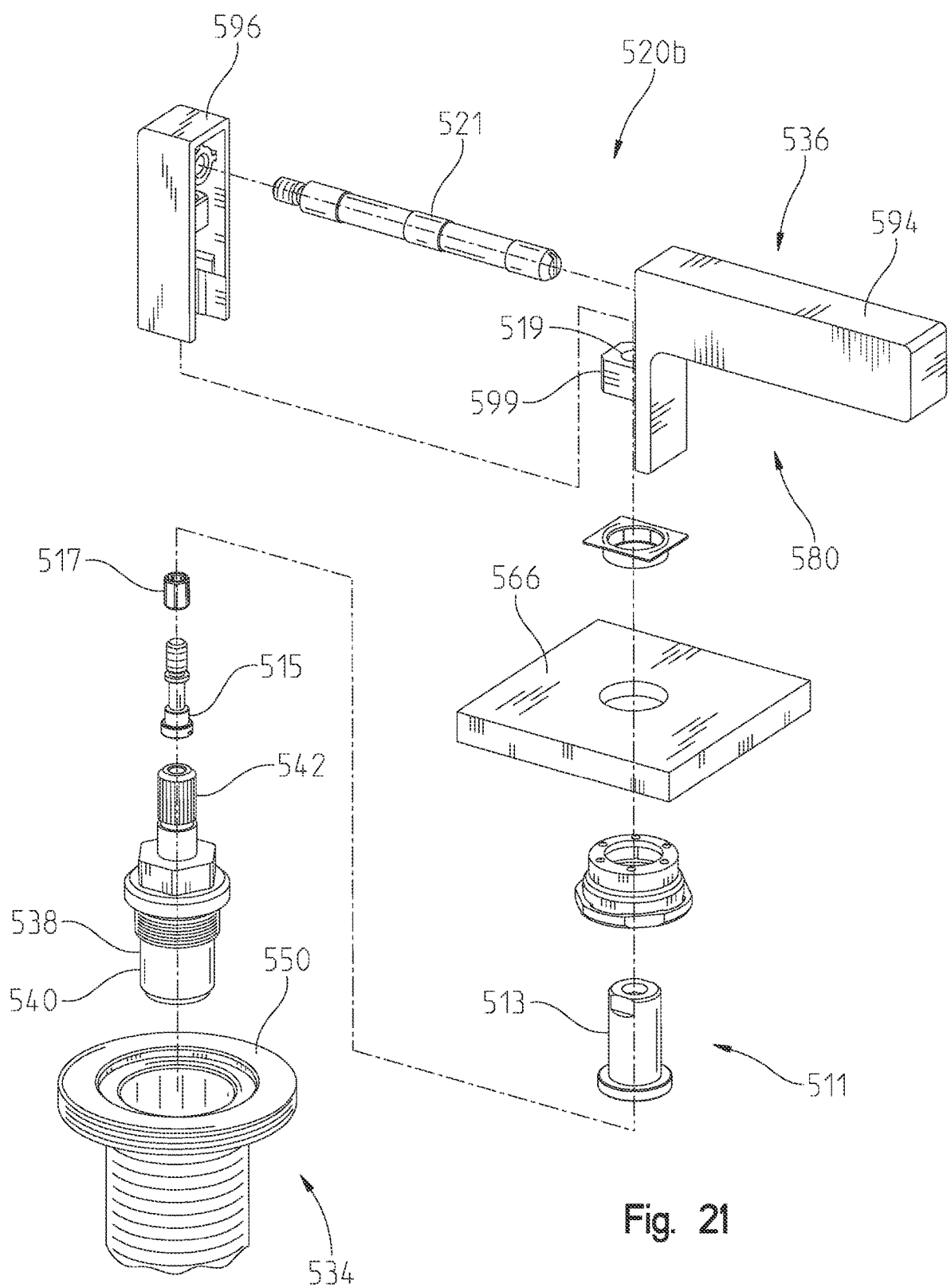
FIG. 21 is a top exploded perspective view of the faucet handle assembly of FIG. 19.
Figure 22:
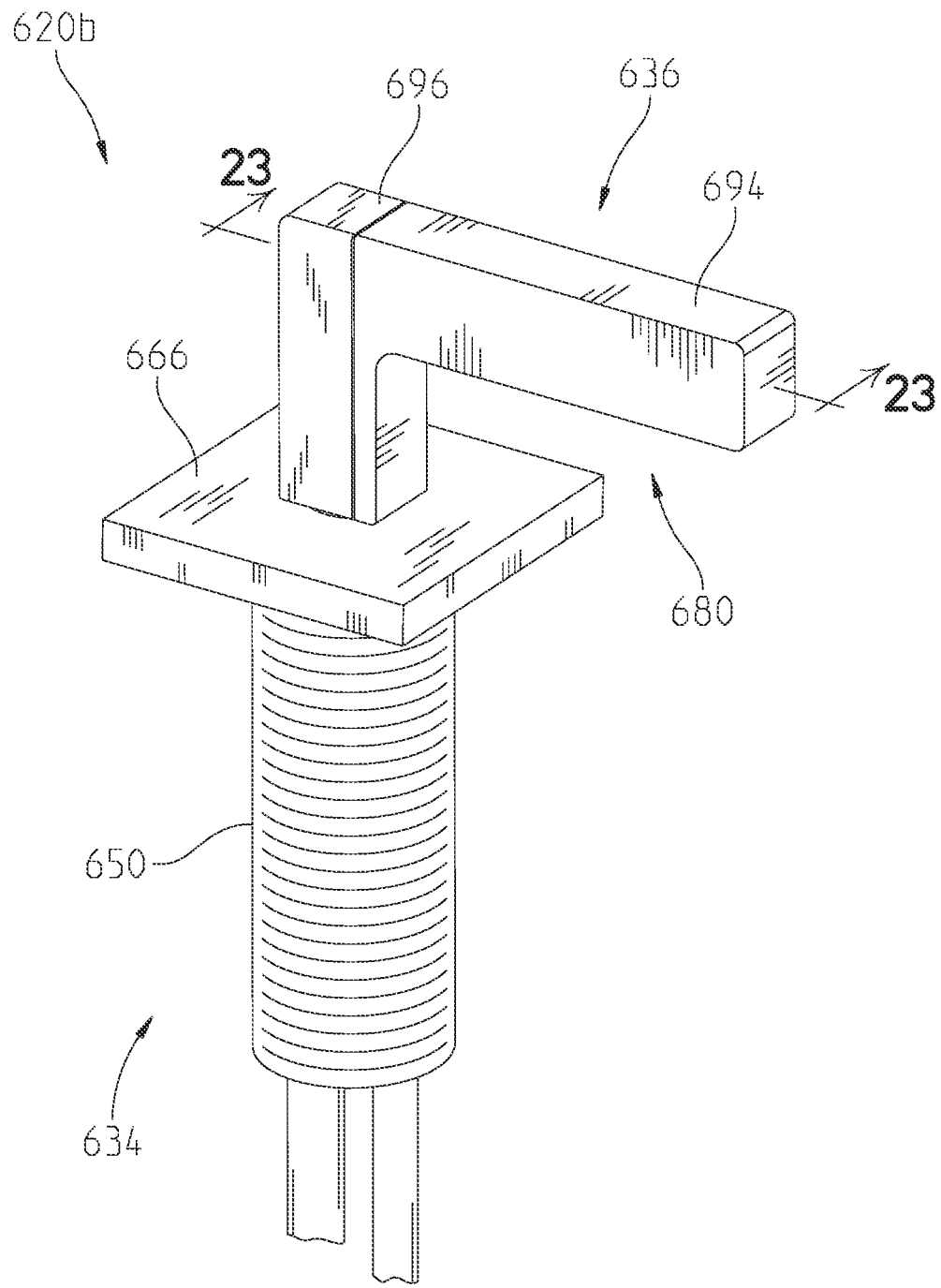
FIG. 22 is a perspective view of a faucet handle assembly according to another embodiment of the present disclosure.
Figure 23:
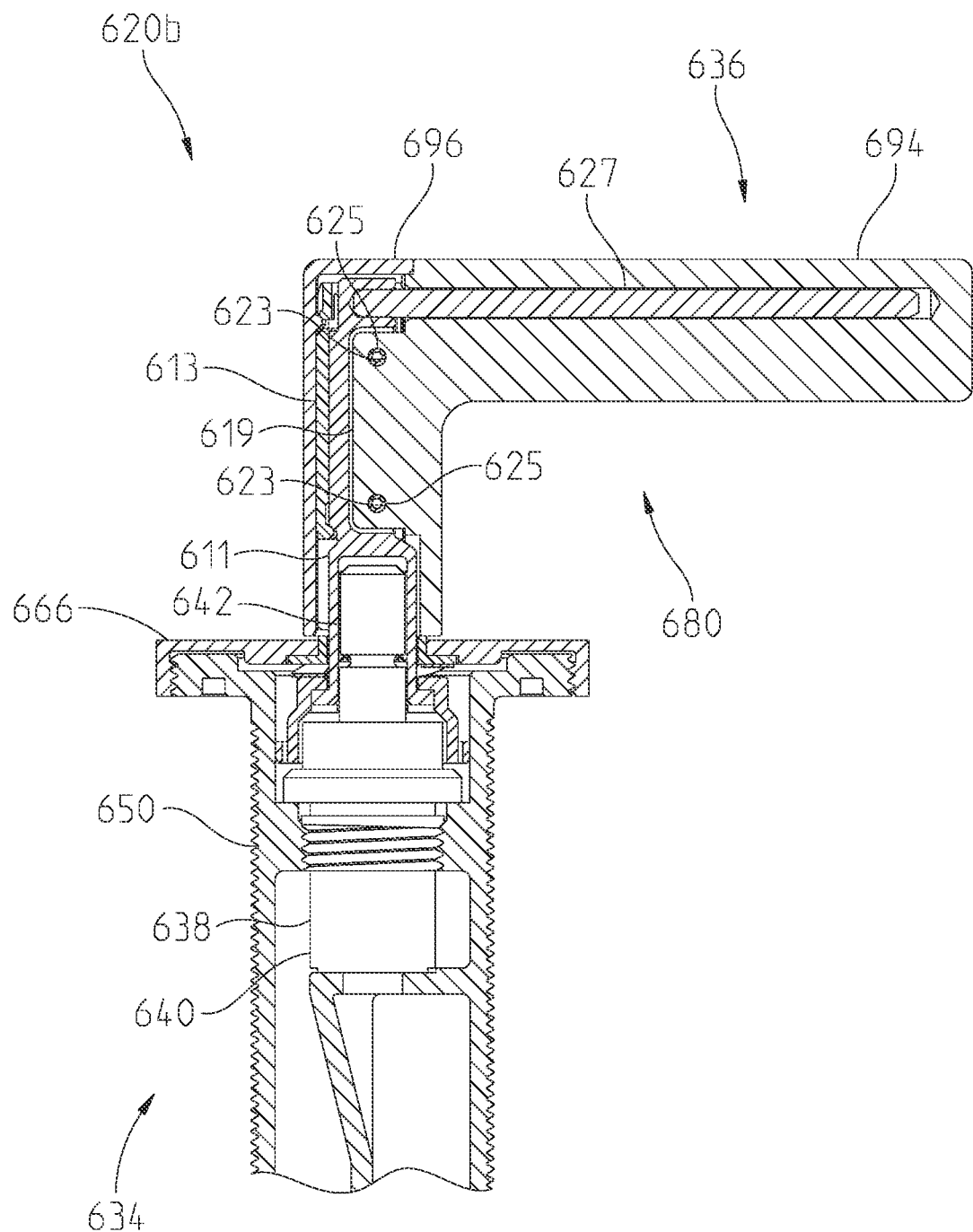
FIG. 23 is a partial sectional view of the faucet handle assembly along line 23-23 of FIG. 22.
Figure 24:
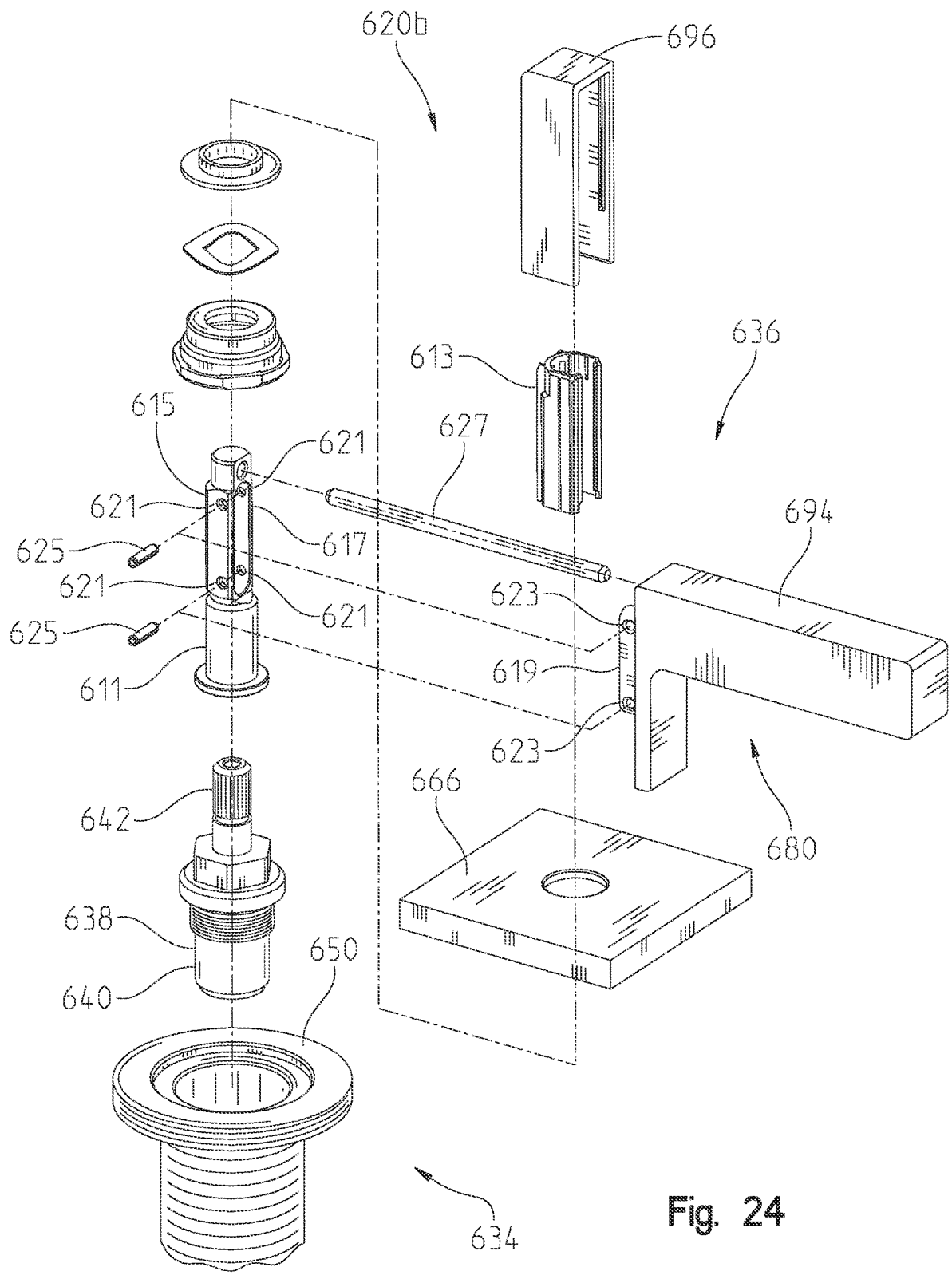
FIG. 24 is a top exploded perspective view of the faucet handle assembly of FIG. 22.
Figure 25:
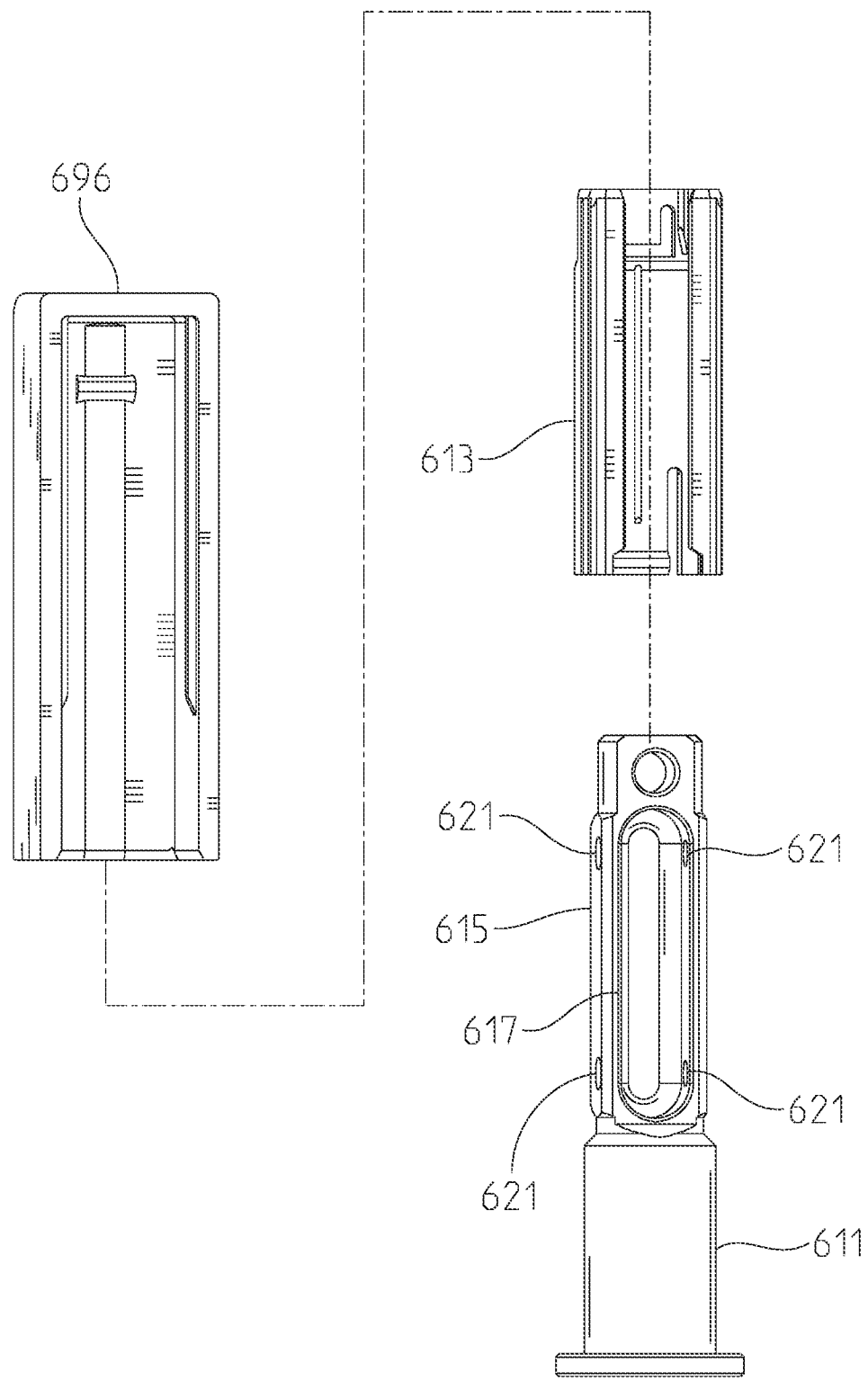
FIG. 25 is a side exploded perspective view of a valve stem adapter, a retainer, and a cover of the faucet handle assembly of FIG. 22.
Figure 26:
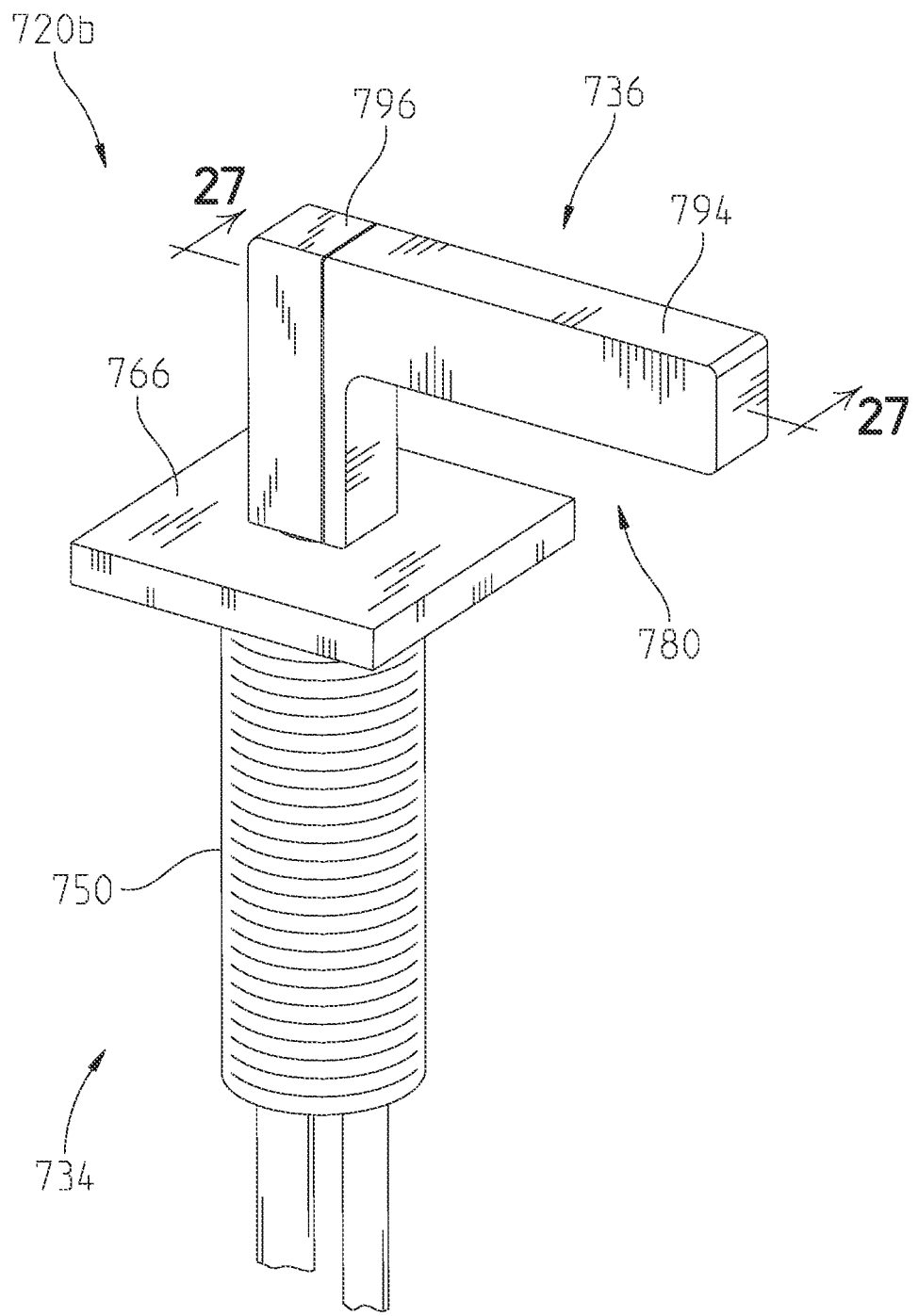
FIG. 26 is a partial perspective view of a faucet handle assembly according to yet another embodiment of the present disclosure.
Figure 27:
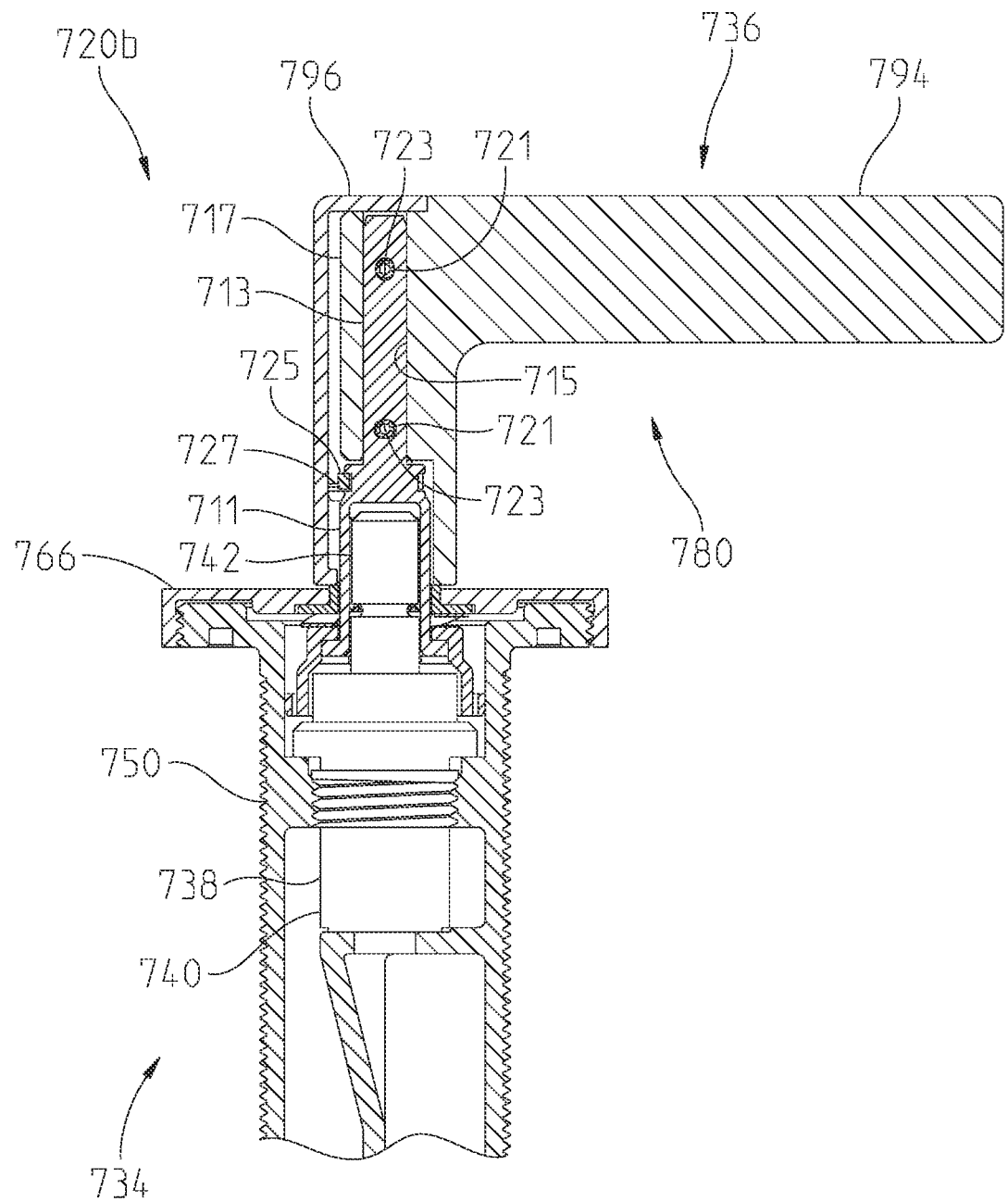
FIG. 27 is a sectional view of the faucet handle assembly along line 27-27 of FIG. 26.
Figure 28:
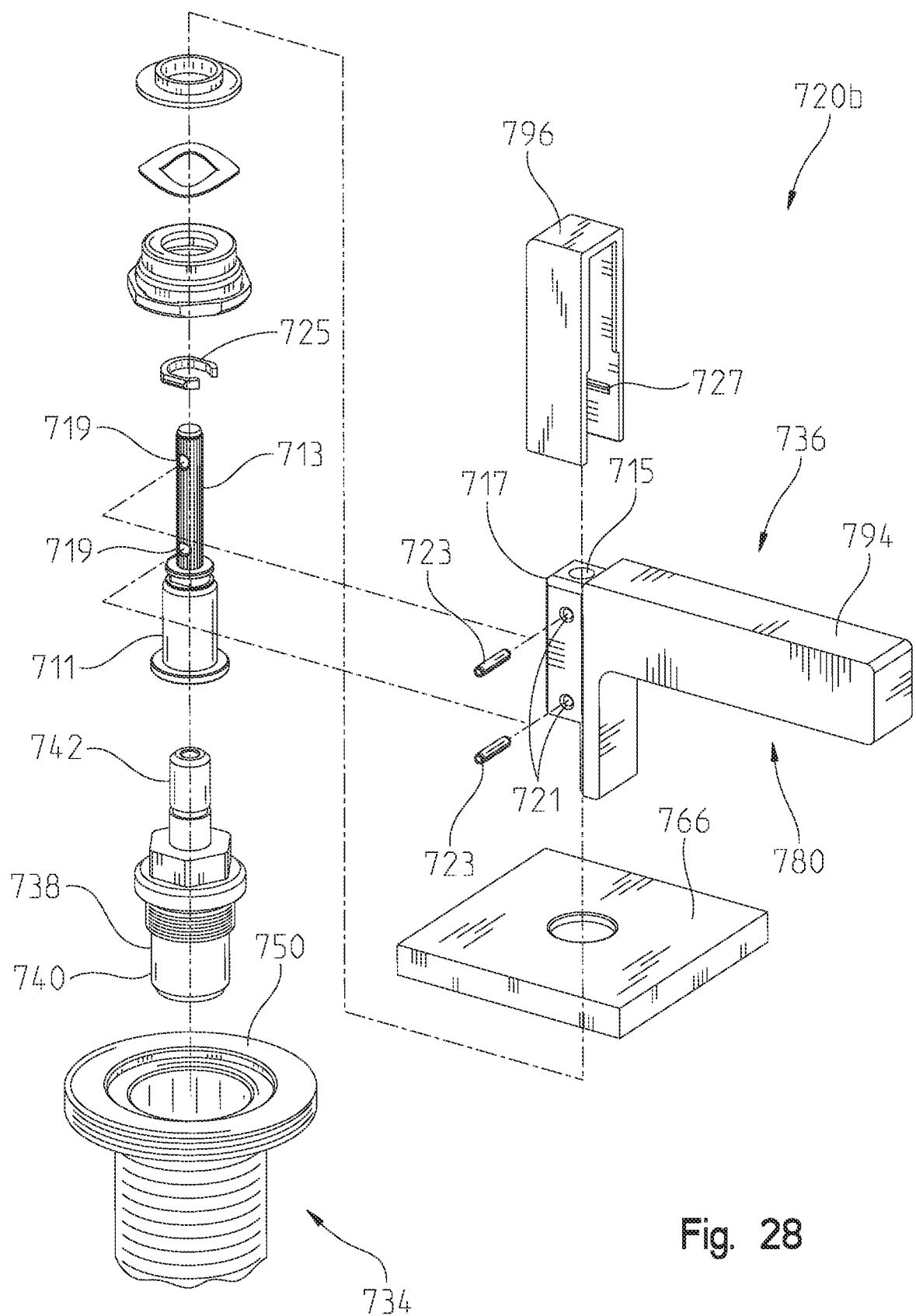
FIG. 28 is a top exploded perspective view of the faucet handle assembly of FIG. 26.
Figure 29:
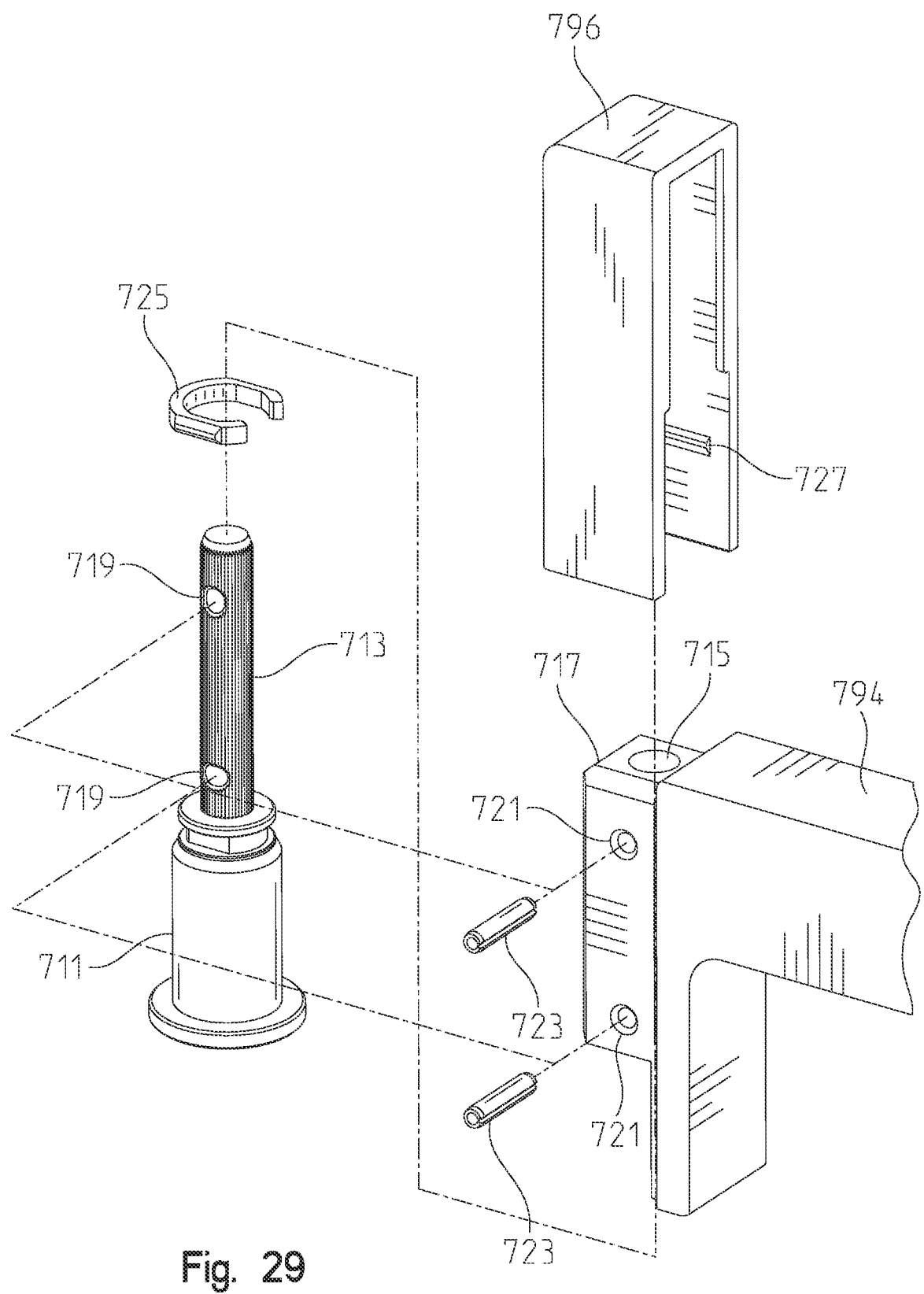
FIG. 29 is a top exploded perspective view of a valve stem adapter, a cover, and a lever of the faucet handle assembly of FIG. 26.

Another illustrative embodiment of a faucet handle assembly 520b is shown in FIGS. 19-21. The faucet handle assembly 520b may be used as part of the faucet 10 instead of the faucet handle assembly 20b. The faucet handle assembly 520b is illustratively shown as a cold water faucet handle. However, the faucet 10 may additionally or alternatively include a substantially identical hot water faucet handle assembly (not shown—i.e., identical except for its relative rotation during operation). The faucet handle assembly 520b includes many of the same elements as the faucet handle assembly 220b detailed above. As such, in the following description, like components are identified with similar reference numbers. The faucet handle assembly 520b includes a lower portion 534 extending below the sink deck 12 (shown elsewhere), and an upper portion 536 extending above the sink deck 12. The lower portion 534 illustratively includes a flow control valve or valve assembly 538, which includes a valve housing 540 and a rotatable valve stem 542. The valve assembly 538 is carried by a mounting shank 550. The upper portion 536 of the handle assembly 520b includes a handle base 566 and an upper handle 580 operably coupled to the valve stem 542. The upper handle 580 includes a valve stem adapter 511 that couples to a primary handle portion or lever 594 and a secondary handle portion or cover 596. The valve stem adapter 511 is formed by an adapter base 513 that couples to the valve stem 542, illustratively, via a splined surface 584 (FIG. 20). The valve stem adapter 511 also includes a fastener 515 that extends through and upwardly from the adapter base 513. The fastener 515 extends through a spacer 517 carried in a passageway 519 of a boss 599 of the lever 594 and threadably engages the cover 596. A horizontally extending fastener 521 also couples the lever 594 to the cover 596.

Another illustrative embodiment of a faucet handle assembly 620b is shown in FIGS. 22-25. The faucet handle assembly 620b may be used as part of the faucet 10 instead of the faucet handle assembly 20b. The faucet handle assembly 620b is illustratively shown as a cold water faucet handle. However, the faucet 10 may additionally or alternatively include a substantially identical hot water faucet handle assembly (not shown—i.e., identical except for its relative rotation during operation). The faucet handle assembly 620b includes many of the same elements as the faucet handle assembly 220b detailed above. As such, in the following description, like components are identified with similar reference numbers. The faucet handle assembly 620b includes a lower portion 634 extending below the sink deck 12 (shown elsewhere), and an upper portion 636 extending above the sink deck 12. The lower portion 634 illustratively includes a flow control valve or valve assembly 638, which includes a valve housing 640 and a rotatable valve stem 642. The valve assembly 638 is carried by a mounting shank 650. The upper portion 636 of the handle assembly 620b includes a handle base 666 and an upper handle 680 operably coupled to the valve stem 642. The upper handle 680 includes a valve stem adapter 611 that couples to a primary handle portion or lever 694 and a secondary handle portion or cover 696 via a retainer 613. The valve stem adapter 611 includes an upper portion 615 that defines a recess 617 for receiving a boss 619 carried by the lever 696. The upper portion 615 and the boss 619 include through openings 621 and 623, respectively, through which spring roll pins 625 extend. A horizontally extending fastener 627 also couples the lever 694 to the valve stem adapter 611.

Yet another illustrative embodiment of a faucet handle assembly 720b is shown in FIGS. 26-29. The faucet handle assembly 720b may be used as part of the faucet 10 instead of the faucet handle assembly 20b. The faucet handle assembly 720b is illustratively shown as a cold water faucet handle. However, the faucet 10 may additionally or alternatively include a substantially identical hot water faucet handle assembly (not shown—i.e., identical except for its relative rotation during operation). The faucet handle assembly 720b includes many of the same elements as the faucet handle assembly 220b detailed above. As such, in the following description, like components are identified with similar reference numbers. The faucet handle assembly 720b includes a lower portion 734 extending below the sink deck 12 (shown elsewhere), and an upper portion 736 extending above the sink deck 12. The lower portion 734 illustratively includes a flow control valve or valve assembly 738, which includes a valve housing 740 and a rotatable valve stem 742. The valve assembly 738 is carried by a mounting shank 750. The upper portion 736 of the handle assembly 720b includes a handle base 766 and an upper handle 780 operably coupled to the valve stem 742. The upper handle 780 includes a valve stem adapter 711 that couples to a primary handle portion or lever 794 and a secondary handle portion or cover 796. The valve stem adapter 711 includes an upper portion 713 that extends through a passageway 715 formed in a boss 717 of the lever 796. The upper portion 713 and the boss 717 include through openings 719 and 721, respectively, through which spring roll pins 723 extend. The valve stem adapter 711 and the cover 796 include securing features for securing those components to one another. As illustrated, the securing features may include a retainer clip 725 carried by the valve stem adapter 711 and one or more ridges 727 carried by the cover 796. Alternatively, the securing features may take other forms.

Although the invention has been described in detail with reference to certain preferred embodiments, variations and modifications exist within the spirit and scope of the invention as described and defined in the following claims.

What is claimed is:

1. A faucet handle assembly configured to be supported by a mounting deck, the faucet handle assembly comprising:
    a valve stem adapter configured to operably couple to a valve stem of a valve assembly, the valve stem adapter configured to rotate about a rotation axis together with the valve stem to facilitate water flow through the valve assembly;
    an upper handle comprising:
        a lever coupled to the valve stem adapter, the lever being disposed on a first side of the rotation axis; and
        a cover coupled to the valve stem adapter;
    a mounting shank configured to be mounted to the mounting deck, the mounting shank comprising an internal chamber; and
    the valve assembly the valve assembly being at least partially received within the internal chamber of the mounting shank, the valve assembly comprising the valve stem and being disposed on a second side of the rotation axis, the second side opposite the first side, and the cover and the lever together obscuring the valve stem adapter.

2. The faucet handle assembly of claim 1, further comprising a fastener coupling the lever to the valve stem adapter.

3. The faucet handle assembly of claim 1, wherein the cover is slidably coupled to the valve stem adapter.

4. The faucet handle assembly of claim 3, wherein the cover comprises one of a groove and a rail for slidably coupling to the valve stem adapter.

5. The faucet handle assembly of claim 3, wherein the cover slidably couples to the valve stem adapter in a direction substantially parallel to the rotation axis.

6. The faucet handle assembly of claim 1, wherein the lever comprises at least one of metal and wood.

7. A faucet handle assembly configured to be supported by a mounting deck, the faucet handle assembly comprising:
    a mounting shank configured to be mounted to the mounting deck, the mounting shank comprising an internal chamber;
    a valve assembly at least partially received within the internal chamber of the mounting shank, the valve assembly comprising a valve stem being rotatable to facilitate water flow through the valve assembly;
    a handle base coupled to the mounting shank;
    a nut threadably coupled to the handle base;
    a bearing coupled to the nut;
    a valve stem adapter coupled to the bearing for rotation relative to the handle base, and the valve stem adapter operably coupled to the valve stem, wherein the nut compresses the bearing against the valve stem adapter; and
    an upper handle comprising a lever operably coupled to the valve stem adapter and the valve stem.

8. The faucet handle assembly of claim 7, wherein the handle base comprises an internal threaded surface, and the nut comprises an external threaded surface that threadably engages the internal threaded surface.

9. The faucet handle assembly of claim 7, wherein the bearing is a split ring bearing.

10. The faucet handle assembly of claim 7, wherein the valve stem adapter comprises an annular groove, the bearing being carried by the valve stem adapter in the annular groove.

11. The faucet handle assembly of claim 7, further comprising an o-ring coupling the handle base to the mounting shank.

12. A faucet handle assembly configured to be supported by a mounting deck, the faucet handle assembly comprising:
    a mounting shank configured to be mounted to the mounting deck, the mounting shank comprising an internal chamber;
    a valve assembly received within the internal chamber of the mounting shank, the valve assembly comprising a valve stem being rotatable to facilitate water flow through the valve assembly;
    a handle base coupled to the mounting shank;
    a nut coupled to the handle base;
    a bearing coupled to the nut;
    a valve stem adapter coupled to the bearing for rotation relative to the handle base, and the valve stem adapter operably coupled to the valve stem, wherein the nut compresses the bearing against the valve stem adapter;
    an upper handle comprising:
        a lever coupled to the valve stem adapter and the valve stem; and
        a cover coupled to the valve stem adapter, and the cover and the lever together obscuring the valve stem adapter.

13. The faucet handle assembly of claim 12, wherein the nut threadably couples to the handle base.

14. The faucet handle assembly of claim 12, wherein the bearing is a split ring bearing.

15. The faucet handle assembly of claim 12, wherein the valve stem adapter comprises an annular groove, the bearing being carried by the valve stem adapter in the annular groove.

16. The faucet handle assembly of claim 12, further comprising an o-ring coupling the handle base to the mounting shank.

17. The faucet handle assembly of claim 12, wherein the valve stem is rotatable about a rotation axis to facilitate water flow through the valve assembly, the lever is disposed on a first side of the rotation axis, and the cover is disposed on a second side of the rotation axis, the second side being opposite the first side.

18. The faucet handle assembly of claim 12, wherein the lever comprises at least one of metal and wood.

\* \* \* \* \*